(12) United States Patent
Suer et al.

(10) Patent No.: US 11,732,406 B2
(45) Date of Patent: *Aug. 22, 2023

(54) TEXTURED FIBROUS STRUCTURES

(71) Applicant: The Procter & Gamble Company, Cincinnati, OH (US)

(72) Inventors: Michael Donald Suer, Colerain Township, OH (US); Fei Wang, Mason, OH (US); John Daniel Algers, Montgomery, OH (US); Christopher Michael Young, Loveland, OH (US); Steven Lee Barnholtz, West Chester, OH (US); Timothy Duane Smith, Lebanon, OH (US); Douglas Jay Barkey, Salem Township, OH (US); Kamilah Gbadamosi Gillispie, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,011

(22) Filed: Nov. 3, 2021

(65) Prior Publication Data
US 2022/0056638 A1     Feb. 24, 2022

Related U.S. Application Data

(63) Continuation of application No. 16/926,823, filed on Jul. 13, 2020, now Pat. No. 11,174,590, which is a
(Continued)

(51) Int. Cl.
*D06N 7/00* (2006.01)
*D21H 27/00* (2006.01)
(Continued)

(52) U.S. Cl.
CPC ............... *D06N 7/00* (2013.01); *B32B 3/30* (2013.01); *B32B 5/266* (2021.05); *D21H 27/002* (2013.01);
(Continued)

(58) Field of Classification Search
CPC ..... B32B 3/30; B32B 5/266; B32B 2262/144; B32B 2260/021; B32B 2432/00;
(Continued)

(56) References Cited

U.S. PATENT DOCUMENTS 3,030,245 A    4/1962   Greiner et al.
3,509,604 A    5/1970   Furbeck
(Continued)

FOREIGN PATENT DOCUMENTS

DE    1122823 B    1/1962
EP    0851061 A2   7/1998
(Continued)

OTHER PUBLICATIONS

All Office Actions, U.S. Appl. No. 16/926,823, filed Jul. 13, 2020.
(Continued)

*Primary Examiner* — Catherine A. Simone
(74) *Attorney, Agent, or Firm* — C. Brant Cook

(57) ABSTRACT

Textured fibrous structures, and more particularly textured fibrous structures having a plurality of deformations such that the textures fibrous structures exhibit novel surface height properties compared to known fibrous structures, and methods for making such textured fibrous structures.

20 Claims, 13 Drawing Sheets

Related U.S. Application Data continuation of application No. 15/209,879, filed on Jul. 14, 2016, now Pat. No. 10,711,395.

(60) Provisional application No. 62/196,491, filed on Jul. 24, 2015.

(51) Int. Cl.
| | | |
|---|---|---|
| *D21H 27/02* | (2006.01) | |
| *B32B 3/30* | (2006.01) | |
| *D21H 27/30* | (2006.01) | |
| *B32B 5/26* | (2006.01) | |

(52) U.S. Cl.
CPC ............ *D21H 27/02* (2013.01); *D21H 27/30* (2013.01); *B32B 2260/021* (2013.01); *B32B 2262/144* (2021.05); *B32B 2432/00* (2013.01); *D06N 2209/106* (2013.01); *D06N 2211/24* (2013.01); *D10B 2509/02* (2013.01); *Y10T 428/24628* (2015.01)

(58) Field of Classification Search
CPC ............... D06N 7/00; D06N 2209/106; D06N 2211/24; D06N 2509/02; D21H 27/002; D21H 27/02; D21H 27/30
See application file for complete search history.

(56) References Cited

U.S. PATENT DOCUMENTS

| | | | |
|---|---|---|---|
| 4,060,360 A | 11/1977 | Tapp | |
| 4,366,111 A | 12/1982 | Dinius et al. | |
| 4,741,941 A | 5/1988 | Englebert | |
| 4,970,104 A | 11/1990 | Radwanski | |
| 5,306,453 A | 4/1994 | Shulman | |
| 5,580,423 A | 12/1996 | Ampulski | |
| 5,725,927 A | 3/1998 | Zilg et al. | |
| 5,962,112 A | 10/1999 | Haynes et al. | |
| 6,087,279 A * | 7/2000 | Laun ...................... | D04H 1/498 442/403 |
| 6,153,053 A | 11/2000 | Harper et al. | |
| 6,233,787 B1 | 5/2001 | Eriksen et al. | |
| 7,972,986 B2 | 7/2011 | Barnholtz et al. | |
| 8,758,569 B2 | 6/2014 | Aberg et al. | |
| 9,103,057 B2 | 8/2015 | Polosa et al. | |
| 9,458,573 B2 | 10/2016 | Barnholtz et al. | |
| 10,711,395 B2 * | 7/2020 | Suer ........................ | D21H 27/02 |
| 11,174,590 B2 * | 11/2021 | Suer ........................ | D06N 7/00 |
| 2003/0002991 A1 | 2/2003 | Kawata | |
| 2003/0200991 A1 | 10/2003 | Keck | |
| 2003/0211802 A1 * | 11/2003 | Keck ...................... | A47L 13/16 15/228 |
| 2005/0247397 A1 | 11/2005 | Kraus et al. | |
| 2005/0247416 A1 | 11/2005 | Forry et al. | |
| 2007/0062658 A1 | 3/2007 | Wiwi et al. | |
| 2009/0220731 A1 | 9/2009 | Manifold et al. | |
| 2011/0244199 A1 | 10/2011 | Brennan et al. | |
| 2011/0250378 A1 | 10/2011 | Eaton | |
| 2012/0006338 A1 | 1/2012 | Herrmann | |
| 2013/0071630 A1 | 3/2013 | Weisman | |
| 2013/0101615 A1 | 4/2013 | Greenstein | |
| 2013/0111682 A1 * | 5/2013 | Pung ....................... | A47L 13/10 15/118 |
| 2013/0216789 A1 | 8/2013 | Kraus et al. | |
| 2013/0327487 A1 | 12/2013 | Espinosa et al. | |
| 2013/0337713 A1 | 12/2013 | Young et al. | |
| 2015/0176218 A1 | 6/2015 | Maladen et al. | |
| 2017/0022660 A1 | 1/2017 | Suer et al. | |
| 2020/0340176 A1 | 10/2020 | Suer et al. | |

FOREIGN PATENT DOCUMENTS

| | | |
|---|---|---|
| GB | 1224325 A | 3/1971 |
| GB | 2493292 A | 10/2022 |
| WO | 2005042273 A2 | 5/2005 |

OTHER PUBLICATIONS

All Office Actions; U.S. Appl. No. 15/209,879, filed Jul. 14, 2016.
International Search Report and Written Opinion; Application Ser. No. PCT/US2016/042262; dated Oct. 19, 2016, 12 pages.

* cited by examiner

TEXTURED FIBROUS STRUCTURES

FIELD OF THE INVENTION

The present invention relates to textured fibrous structures, and more particularly to textured fibrous structures comprising a plurality of deformations such that the textured fibrous structures exhibit novel surface height properties compared to known fibrous structures, and methods for making such textured fibrous structures.

BACKGROUND OF THE INVENTION

Textured fibrous structures comprising filaments are known in the art. However, consumers of such known textured fibrous structures, which exhibit relatively low surface height properties, desire higher surface height properties in their textured fibrous structures.

As shown in FIGS. 1A-1B, an example of a prior art textured fibrous structure 10, in this case a textured spunlaced fibrous structure, exhibits a relatively flat surface 12 into which a pattern or in this case one or more objects 14, such as a butterfly and/or heart, is depressed into the flat surface 12. Such a prior art textured fibrous structure 10 exhibits lower surface height properties than are desired by consumers.

As shown in FIGS. 2A-2B, another example of a prior art textured fibrous structure 10 exhibits a relatively flat surface 12 into which a pattern or in this case one or more objects 14, such as a duck and/or a leaf, is depressed into the flat surface 12. Such a prior art textured fibrous structure 10 exhibits low surface height properties than are desired by consumers.

One problem with known textured fibrous structures, for example known textured fibrous structures comprising a plurality of filaments, is that they exhibit lower than desirable surface height properties such that less than desirable actual and/or perceived bowel movement removal during use by consumers is experienced.

To date, manufacturers of known filament-containing fibrous structures have not imparted texture to at least one surface of the known filament-containing fibrous structures that achieves the surface height properties desired by consumers. In the past, manufacturers of filament-containing fibrous structures have utilized patterned thermal bonding rolls, such as point bond patterns and/or objects, such as butterflies and ducks, to bond its filaments and materials together to give such fibrous structures integrity, but have not imparted sufficient texture into at least one of the surfaces such that the fibrous structures exhibit greater surface height properties to meet the consumers' needs.

Accordingly, there is a need for textured fibrous structures, for example textured fibrous structures comprising a plurality of filaments, that exhibit greater surface height properties compared to known textured fibrous structures, for example known textured fibrous structures comprising a plurality of filaments, and thus improved actual and/or perceived bowel movement cleaning, and methods for making such textured fibrous structures.

SUMMARY OF THE INVENTION

The present invention fulfills the needs described above by providing textured fibrous structures, for example textured fibrous structures comprising a plurality of filaments, that exhibit greater surface height properties compared to known textured fibrous structures, for example known textured fibrous structures comprising a plurality of filaments, and thus improved actual and/or perceived bowel movement cleaning, and methods for making such textured fibrous structures.

One solution to the problem identified above is to produce a textured fibrous structure, for example a textured fibrous structure comprising a plurality of filaments and/or comprising a liquid composition, such as a lotion composition, comprising at least one surface comprising a plurality of deformations (protrusions and/or depressions) such that the surface of the textured fibrous structure exhibits one or more of the following surface height properties desirable to consumers of the textured fibrous structures for improved actual and/or perceived bowel movement cleaning: an average absolute surface height value (Sa) of greater than 250 µm, a root mean square average surface height value (Sq) of greater than 300 µm, and/or a height difference surface height value (Sk) of greater than 825 µm as measured according to the Surface Height Test Method is provided.

In one example of the present invention, a textured fibrous structure, for example a textured fibrous structure comprising a plurality of filaments and/or comprising a liquid composition, such as a lotion composition, comprising at least one surface comprising a plurality of deformations (protrusions and/or depressions) such that the surface of the textured fibrous structure exhibits an average absolute surface height value (Sa) of greater than 250 µm as measured according to the Surface Height Test Method is provided.

In another example of the present invention, a textured fibrous structure, for example a textured fibrous structure comprising a plurality of filaments and/or comprising a liquid composition, such as a lotion composition, comprising at least one surface comprising a plurality of deformations (protrusions and/or depressions) such that the surface of the textured fibrous structure exhibits a root mean square average surface height value (Sq) of greater than 300 µm as measured according to the Surface Height Test Method is provided.

In another example of the present invention, a textured fibrous structure, for example a textured fibrous structure comprising a plurality of filaments and/or comprising a liquid composition, such as a lotion composition, comprising at least one surface comprising a plurality of deformations (protrusions and/or depressions) such that the surface of the textured fibrous structure exhibits a height difference surface height value (Sk) of greater than 825 µm as measured according to the Surface Height Test Method is provided.

In still another example of the present invention, a single- or multi-ply sanitary tissue product comprising at least one textured fibrous structure, for example a textured fibrous structure comprising a plurality of filaments and/or comprising a liquid composition, such as a lotion composition, according to the present invention is provided.

In yet another example of the present invention, a process for making a textured fibrous structure, for example a textured fibrous structure comprising a plurality of filaments and/or comprising a liquid composition, such as a lotion composition, according to the present invention comprises the step of imparting deformations (protrusions and/or depressions) to at least one surface of a fibrous structure, for example a fibrous structure comprising a plurality of filaments, such that the surface of the textured fibrous structure exhibits an average absolute surface height value (Sa) of greater than 250 µm as measured according to the Surface Height Test Method is provided.

In yet another example of the present invention, a process for making a textured fibrous structure, for example a textured fibrous structure comprising a plurality of filaments and/or comprising a liquid composition, such as a lotion composition, according to the present invention comprises the step of imparting deformations (protrusions and/or depressions) to at least one surface of a fibrous structure, for example a fibrous structure comprising a plurality of filaments, such that the surface of the textured fibrous structure exhibits a root mean square average surface height value (Sq) of greater than 300 μm as measured according to the Surface Height Test Method is provided.

In yet another example of the present invention, a process for making a textured fibrous structure, for example a textured fibrous structure comprising a plurality of filaments and/or comprising a liquid composition, such as a lotion composition, according to the present invention comprises the step of imparting deformations (protrusions and/or depressions) to at least one surface of a fibrous structure, for example a fibrous structure comprising a plurality of filaments, such that the surface of the textured fibrous structure exhibits a height difference surface height value (Sk) of greater than 825 μm as measured according to the Surface Height Test Method is provided.

For consumers to experience the desired benefits of the textured surface, it will in many cases cases be important that the texture is consistent on either side of the fibrous textured structure, such as the Sa, Sq, Sk values on one side of the fibrous structure are similar, for example less than 10% and/or less than 5% and/or less than 3% and/or less than 1% difference between values, to the respective values of Sa, Sq, Sk on the other side of the fibrous structure. One way to create such fibrous structures is to combine 2 identical plies of textured fibrous structures in such a way that the external surface of the resulting 2-ply fibrous structure has identical Sa, Sk, Sq values. In one example, the fibrous structure plies may be bonded together, such as by thermal bonding and/or adhesive bonding, to form a multi-ply textured fibrous structure.

The present invention provides novel textured fibrous structures, for example novel textured fibrous structures comprising a plurality of filaments and/or comprising a liquid composition, such as a lotion composition, that exhibit improved surface height properties compared to known textured fibrous structures, and methods for making same.

DETAILED DESCRIPTION OF THE INVENTION

Definitions

Figure 1A:
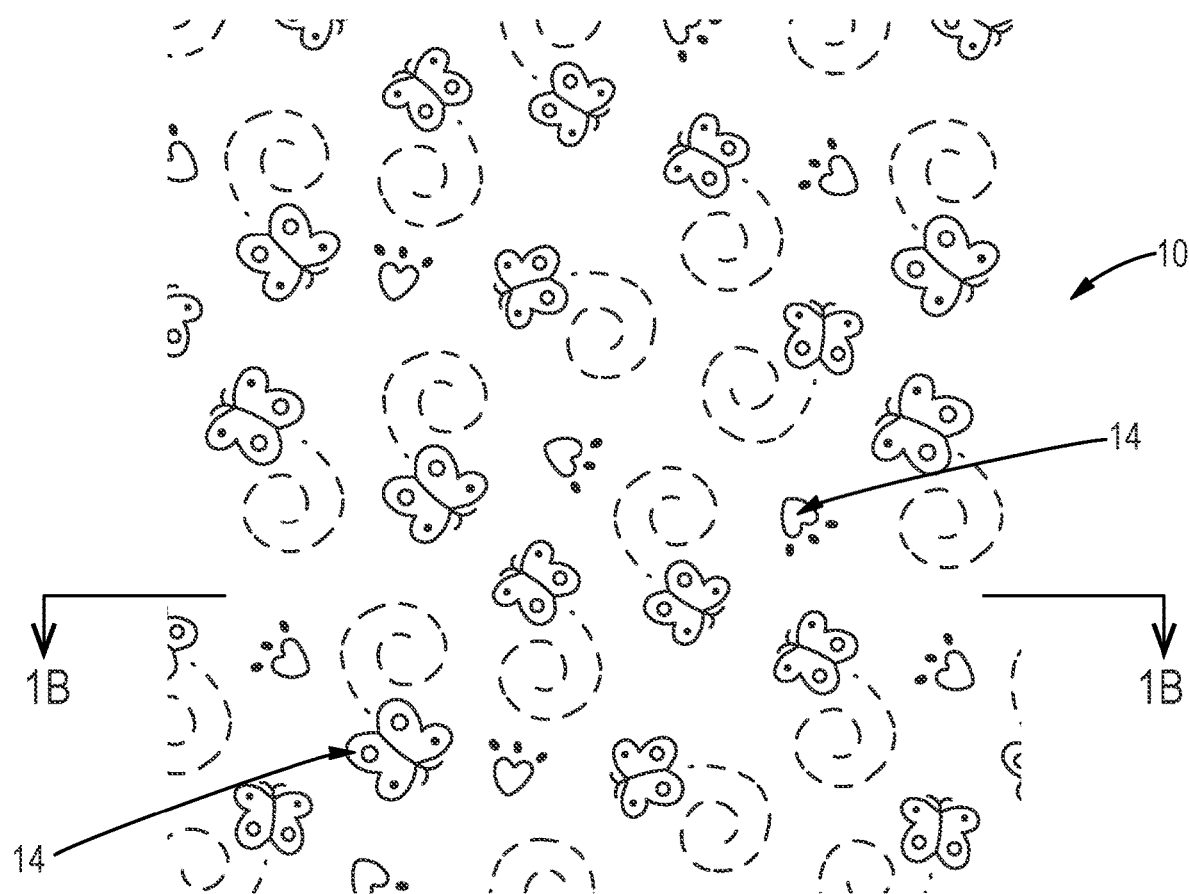
FIG. 1A is a schematic representation of an example of a Prior Art textured fibrous structure.

"Fibrous structure" as used herein means a structure that comprises one or more fibrous elements, filaments and/or fibers. In one example, the fibrous structure is a wipe, such as a wet wipe, for example a baby wipe. In another example, the fibrous structure is a paper towel, such as a dry paper towel. In one example, a fibrous structure according to the present invention means an orderly arrangement of filaments and/or fibers within a structure in order to perform a function. In another example, a fibrous structure according to the present invention is a nonwoven.

Non-limiting examples of processes for making fibrous structures include known wet-laid papermaking processes, air-laid papermaking processes including carded and/or spunlaced processes, as well as meltblown and/or spunbond processes. Such wet-laid and/or air-laid processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

The fibrous structures of the present invention may be homogeneous or may be layered. If layered, the fibrous structures may comprise at least two and/or at least three and/or at least four and/or at least five layers.

In one example the fibrous structure is a nonwoven.

"Nonwoven" for purposes of the present invention as used herein and as defined by EDANA means a sheet of fibers, continuous filaments, or chopped yarns of any nature or origin, that have been formed into a web by any means, and bonded together by any means, with the exception of weaving or knitting. Felts obtained by wet milling are not nonwovens. Wetlaid webs are nonwovens provided that they contain a minimum of 50% by weight of man-made fibers, filaments or other fibers of non-vegetable origin with a length to diameter ratio that equals or exceeds 300 or a minimum of 30% by weight of man-made fibers, filaments or other fibers of non-vegetable origin with a length to diameter ratio that equals or exceeds 600 and a maximum apparent density of 0.40 g/cm$^3$.

The fibrous structures of the present invention may be co-formed fibrous structures.

"Co-formed fibrous structure" as used herein means that the fibrous structure comprises a mixture of at least two different materials wherein at least one of the materials comprises a filament, such as a polypropylene filament, and at least one other material, different from the first material, comprises a solid additive, such as a fiber and/or a particulate. In one example, a co-formed fibrous structure comprises solid additives, such as fibers, such as wood pulp fibers and/or absorbent gel materials and/or filler particles and/or particulate spot bonding powders and/or clays, and filaments, such as polypropylene filaments.

"Solid additive" as used herein means a fiber and/or a particulate.

"Particulate" as used herein means a granular substance or powder.

"Fiber" and/or "Filament" as used herein means an elongate particulate having an apparent length greatly exceeding its apparent width, i.e. a length to diameter ratio of at least about 10. For purposes of the present invention, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Non-limiting examples of fibers include wood pulp fibers, rayon, which in turn includes but is not limited to viscose, lyocell, cotton; wool; silk; jute; linen; ramie; hemp; flax; camel hair; kenaf; and synthetic staple fibers made from polyester, nylons, polyolefins such as polypropylene, polyethylene, natural polymers, such as starch, starch derivatives, cellulose and cellulose derivatives, hemicellulose, hemicellulose derivatives, chitin, chitosan, polyisoprene (cis and trans), peptides, polyhydroxyalkanoates, copolymers of polyolefins such as polyethylene-octene, and biodegradable or compostable thermoplastic fibers such as polylactic acid filaments, polyvinyl alcohol filaments, and polycaprolactone filaments. The fibers may be monocomponent or multicomponent, such as bicomponent filaments, round, non-round fibers; and combinations thereof.

Filaments are typically considered continuous or substantially continuous in nature. Filaments are relatively longer than fibers. Non-limiting examples of filaments include meltblown and/or spunbond filaments. Non-limiting examples of materials that can be spun into filaments include natural polymers, such as starch, starch derivatives, cellulose and cellulose derivatives, hemicellulose, hemicellulose derivatives, chitin, chitosan, polyisoprene (cis and trans), peptides, polyhydroxyalkanoates, and synthetic polymers including, but not limited to, thermoplastic polymer filaments comprising thermoplastic polymers, such as polyesters, nylons, polyolefins such as polypropylene filaments, polyethylene filaments, polyvinyl alcohol and polyvinyl alcohol derivatives, sodium polyacrylate (absorbent gel material) filaments, and copolymers of polyolefins such as polyethylene-octene, and biodegradable or compostable thermoplastic fibers such as polylactic acid filaments, polyvinyl alcohol filaments, and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. Nos. 4,300,981 and 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

In addition to the various wood pulp fibers, other cellulosic fibers such as cotton linters, rayon, lyocell and bagasse can be used in this invention. Other sources of cellulose in the form of fibers or capable of being spun into fibers include grasses and grain sources.

"Sanitary tissue product" as used herein means a soft, low density (i.e. <about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). Non-limiting examples of suitable sanitary tissue products of the present invention include paper towels, bath tissue, facial tissue, napkins, baby wipes, adult wipes, wet wipes, cleaning wipes, polishing wipes, cosmetic wipes, car care wipes, wipes that comprise an active agent for performing a particular function, cleaning substrates for use with implements, such as a Swifter® cleaning wipe/pad. The sanitary tissue product may be convolutedly wound upon itself about a core or without a core to form a sanitary tissue product roll.

In one example, the sanitary tissue product of the present invention comprises a fibrous structure according to the present invention.

The sanitary tissue products of the present invention may exhibit a basis weight between about 10 g/m$^2$ to about 500 g/m$^2$ and/or from about 15 g/m$^2$ to about 400 g/m$^2$ and/or from about 20 g/m$^2$ to about 300 g/m$^2$ and/or from about 20 g/m$^2$ to about 200 g/m$^2$ and/or from about 20 g/m$^2$ to about 150 g/m$^2$ and/or from about 20 g/m$^2$ to about 120 g/m$^2$ and/or from about 20 g/m$^2$ to about 110 g/m$^2$ and/or from about 20 g/m$^2$ to about 100 g/m$^2$ and/or from about 30 to 90 g/m$^2$. In addition, the sanitary tissue product of the present invention may exhibit a basis weight between about 40 g/m$^2$ to about 500 g/m$^2$ and/or from about 50 g/m$^2$ to about 400 g/m$^2$ and/or from about 55 g/m$^2$ to about 300 g/m$^2$ and/or from about 60 to 200 g/m$^2$. In one example, the sanitary tissue product exhibits a basis weight of less than 100 g/m$^2$ and/or less than 80 g/m$^2$ and/or less than 75 g/m$^2$ and/or less than 70 g/m$^2$ and/or less than 65 g/m$^2$ and/or less than 60 g/m² and/or less than 55 g/m² and/or less than 50 g/m² and/or less than 47 g/m² and/or less than 45 g/m² and/or less than 40 g/m² and/or less than 35 g/m² and/or to greater than 20 g/m² and/or greater than 25 g/m² and/or greater than 30 g/m² as measured according to the Basis Weight Test Method described herein.

In one example, the sanitary tissue product of the present invention may exhibit a CD Wet Initial Tensile Strength of/or greater than 5.0 N and/or greater than 5.5 N and/or greater than 6.0 N as measured according to the CD Wet Initial Tensile Strength Test Method described herein.

The sanitary tissue products of the present invention may exhibit a density (measured at 95 g/in²) of less than about 0.60 g/cm³ and/or less than about 0.30 g/cm³ and/or less than about 0.20 g/cm³ and/or less than about 0.10 g/cm³ and/or less than about 0.07 g/cm³ and/or less than about 0.05 g/cm³ and/or from about 0.01 g/cm³ to about 0.20 g/cm³ and/or from about 0.02 g/cm³ to about 0.10 g/cm³.

The sanitary tissue products of the present invention may comprises additives such as softening agents, temporary wet strength agents, permanent wet strength agents, bulk softening agents, silicones, wetting agents, latexes, especially surface-pattern-applied latexes, dry strength agents such as carboxymethylcellulose and starch, and other types of additives suitable for inclusion in and/or on sanitary tissue products.

Figure 3A:
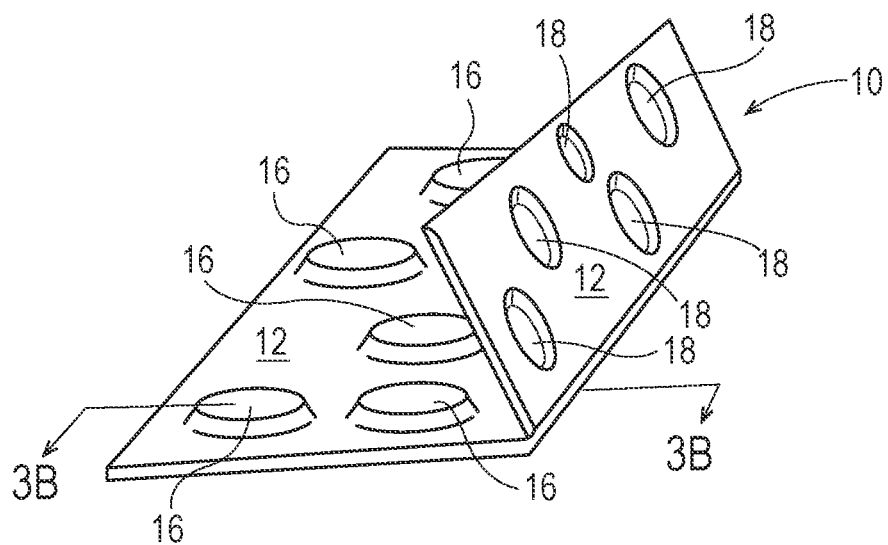
FIG. 3A is a perspective view of an example of textured fibrous structure according to the present invention.
Figure 3B:
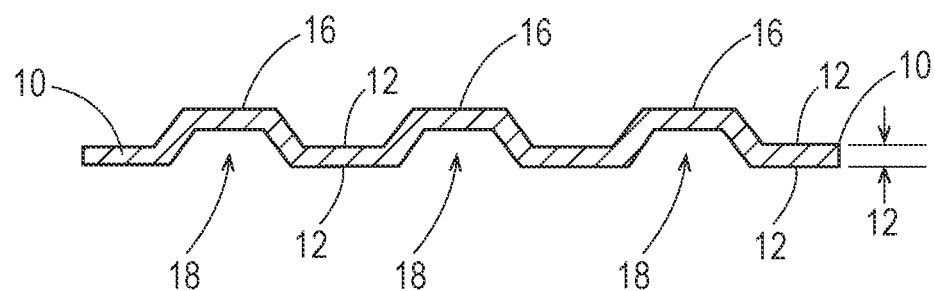
FIG. 3B is a cross-sectional view of FIG. 3A taken along line 3B-3B.
Figure 4:
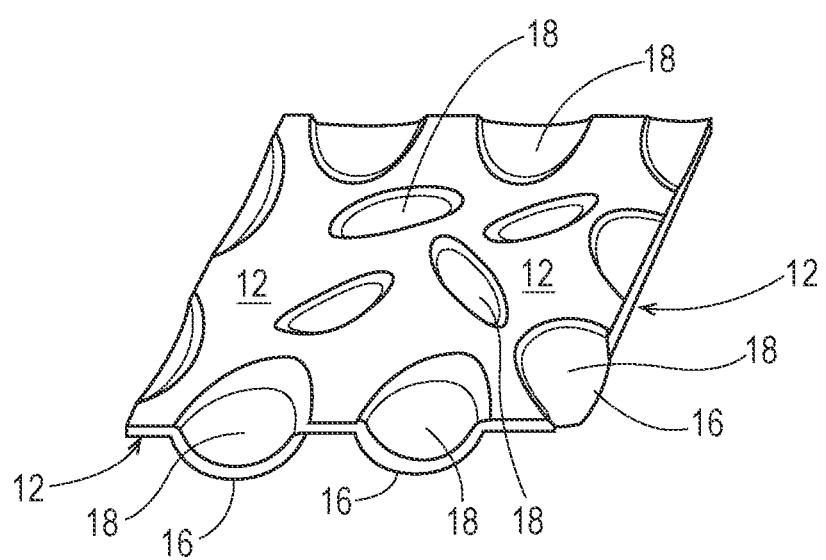
FIG. 4 is a perspective view of another example of a textured fibrous structure according to the present invention.

"Deformations" as used herein means surface height ("z"-oriented) objects; namely, protrusions 16 and/or depressions 18 on a surface 12 of the textured fibrous structure 10 as shown in FIGS. 3A, 3B and 4. The deformations may be out-of-plane portions of the surface of the textured fibrous structure. In one example, at least one surface of the textured fibrous structure of the present invention comprises a plurality of discrete deformations, for example a plurality of discrete protrusions and/or a plurality of discrete depressions. In one example, the textured fibrous structure comprises a first surface comprising a plurality of discrete protrusions and a second surface, opposite the first surface, comprising a plurality of discrete depressions. In another example, the textured fibrous structure comprises a first surface comprising a plurality of discrete protrusions and a second surface, opposite the first surface, comprising a plurality of discrete depressions, wherein at least one of the discrete protrusions and one of the discrete depressions are registered with one another in a one-to-one relationship.

Further, the plurality of deformations on a surface of the textured fibrous structure are present in a non-random, repeating pattern, for example a single deformation may be in the shape of an object, such as a heart, a butterfly, a leaf, a flower, and not simply a geometric shape. In another example, two or more or three or more discrete deformations may together form a design or object, such as a flower (petals of the flower). Such designs and/or objects are achievable using patterned resinous belts and/or patterned rolls to impart the deformations to the fibrous structure and have not been achievable using woven fabrics to impart texture, if any, to fibrous structures.

"Elements" as used herein means an x-y plane of a deformation; namely, an x-y plane of a protrusion and an x-y plane of a depression. The elements and their characteristics, such as area, perimeter, aspect ratio, angle (such as feret angle), inter-element distances, etc. are determined and measured according to the Element Characterization Test Method described herein. In one example, the textured fibrous structure of the present invention comprises at least one surface comprising greater than 10% and/or greater than 15% and/or greater than 20% and/or greater than 25% and/or greater than 30% and/or greater than 35% of elements that exhibits an average area of greater than 10 mm² and/or greater than 15 mm² and/or greater than 20 mm² and/or greater than 25 mm² and/or greater than 30 mm² as measured according to the Element Characterization Test Method described herein.

"Basis Weight" as used herein is the weight per unit area of a sample reported in lbs/3000 ft² or g/m² (gsm).

"Stack" as used herein, refers to a neat pile of fibrous structures and/or wipes. Based upon the assumption that there are at least three wipes in a stack, each wipe, except for the topmost and bottommost wipes in the stack, will be directly in face to face contact with the wipe directly above and below itself in the stack. Moreover, when viewed from above, the wipes will be layered on top of each other, or superimposed, such that only the topmost wipe of the stack will be visible. The height of the stack is measured from the bottom of the bottommost wipe in the stack to the top of the topmost wipe in the stack and is provided in units of millimeters (mm).

"Liquid composition" and "lotion" are used interchangeably herein and refer to any liquid, including, but not limited to a pure liquid such as water, an aqueous solution, a colloid, an emulsion, a suspension, a solution and mixtures thereof. The term "aqueous solution" as used herein, refers to a solution that is at least about 20% and/or at least about 40% and/or at least about 50% water by weight, and is no more than 99.9% and/or no more than about 99% and/or no more than about 98% and/or no more than about 97% and/or no more than about 95% and/or no more than about 90% water by weight.

In one example, the liquid composition comprises water or another liquid solvent. Generally the liquid composition is of sufficiently low viscosity to impregnate the entire structure of the fibrous structure. In another example, the liquid composition may be primarily present at the fibrous structure surface and to a lesser extent in the inner structure of the fibrous structure. In a further example, the liquid composition is releasably carried by the fibrous structure, that is the liquid composition is carried on or in the fibrous structure and is readily releasable from the fibrous structure by applying some force to the fibrous structure, for example by wiping a surface with the fibrous structure.

The liquid compositions used in the present invention are primarily although not limited to, oil in water emulsions. In one example, the liquid composition of the present invention comprises at least 80% and/or at least 85% and/or at least 90% and/or at least 95% by weight water.

When present on or in the fibrous structure, the liquid composition may be present at a level of from about 10% to about 1000% of the basis weight of the fibrous structure and/or from about 100% to about 700% of the basis weight of the fibrous structure and/or from about 200% to about 500% and/or from about 200% to about 400% of the basis weight of the fibrous structure.

The liquid composition may comprise an acid. Non-limiting examples of acids that can be used in the liquid composition of the present invention are adipic acid, tartaric acid, citric acid, maleic acid, malic acid, succinic acid, glycolic acid, glutaric acid, malonic acid, salicylic acid, gluconic acid, polymeric acids, phosphoric acid, carbonic acid, fumaric acid and phthalic acid and mixtures thereof. Suitable polymeric acids can include homopolymers, copolymers and terpolymers, and may contain at least 30 mole % carboxylic acid groups. Specific examples of suitable polymeric acids useful herein include straight-chain poly (acrylic) acid and its copolymers, both ionic and nonionic, (e.g., maleic-acrylic, sulfonic-acrylic, and styrene-acrylic copolymers), those cross-linked polyacrylic acids having a molecular weight of less than about 250,000, preferably less than about 100,000 poly (α-hydroxy) acids, poly (methacrylic) acid, and naturally occurring polymeric acids such as carageenic acid, carboxy methyl cellulose, and alginic acid. In one example, the liquid composition comprises citric acid and/or citric acid derivatives.

The liquid composition may also contain salts of the acid or acids used to lower the pH, or another weak base to impart buffering properties to the fibrous structure. The buffering response is due to the equilibrium which is set up between the free acid and its salt. This allows the fibrous structure to maintain its overall pH despite encountering a relatively high amount of bodily waste as would be found post urination or defecation in a baby or adult. In one embodiment the acid salt would be sodium citrate. The amount of sodium citrate present in the lotion would be between 0.01 and 2.0%, alternatively 0.1 and 1.25%, or alternatively 0.2 and 0.7% of the lotion.

In one example, the liquid composition does not contain any preservative compounds.

In addition to the above ingredients, the liquid composition may comprise addition ingredients. Non-limiting examples of additional ingredients that may be present in the liquid composition of the present invention include: skin conditioning agents (emollients, humectants) including, waxes such as petrolatum, cholesterol and cholesterol derivatives, di and tri-glycerides including sunflower oil and sesame oil, silicone oils such as dimethicone copolyol, caprylyl glycol and acetoglycerides such as lanolin and its derivatives, emulsifiers; stabilizers; surfactants including anionic, amphoteric, cationic and non ionic surfactants, colourants, chelating agents including EDTA, sun screen agents, solubilizing agents, perfumes, opacifying agents, vitamins, viscosity modifiers; such as xanthan gum, astringents and external analgesics.

"Pre-moistened" and "wet" are used interchangeably herein and refer to fibrous structures and/or wipes which are moistened with a liquid composition prior to packaging in a generally moisture impervious container or wrapper. Such pre-moistened wipes, which can also be referred to as "wet wipes" and "towelettes", may be suitable for use in cleaning babies, as well as older children and adults.

"Saturation loading" and "lotion loading" are used interchangeably herein and refer to the amount of liquid composition applied to the fibrous structure or wipe. In general, the amount of liquid composition applied may be chosen in order to provide maximum benefits to the end product comprised by the wipe. Saturation loading is typically expressed as grams of liquid composition per gram of dry wipe.

Saturation loading, often expressed as percent saturation, is defined as the percentage of the dry fibrous structure or wipe's mass (void of any liquid composition) that a liquid composition present on/in the fibrous structure or wipe represents. For example, a saturation loading of 1.0 (equivalently, 100% saturation) indicates that the mass of liquid composition present on/in the fibrous structure or wipe is equal to the mass of dry fibrous structure or wipe (void of any liquid composition).

The following equation is used to calculate saturation load of a fibrous structure or wipe:

$$\text{Saturation Loading} = \left[\frac{\text{wet wipe mass}}{(\text{wipe size}) * (\text{basis weight})}\right] - 1$$

"Saturation gradient index" (SGI) is a measure of how well the wipes at the top of a stack retain moisture. The SGI of a stack of wipes is measured as described infra and is calculated as the ratio of the average lotion load of the bottommost wipes in the stack versus the topmost wipes in the stack. The ideal stack of wipes will have an SGI of about 1.0; that is, the topmost wipes will be equally as moist as the bottommost wipes. In the aforementioned embodiments, the stacks have a SGI from about 1.0 to about 1.5.

The saturation gradient index for a fibrous structure or wipe stack is calculated as the ratio of the saturation loading of a set number of fibrous structures or wipes from the bottom of a stack to that of the same number of fibrous structures or wipes from the top of the stack. For example, for an approximately 80 count wipe stack, the saturation gradient index is this ratio using 10 wipes from bottom and top; for an approximately 30 count wipe stack, 5 wipes from bottom and top are used; and for less than 30, only the top and bottom single wipes are used in the saturation gradient index calculation. The following equation illustrates the example of an 80 count stack saturation gradient index calculation:

$$\text{Saturation Gradient Index} = \frac{\text{average lotion load of bottom 10 wipes in stack}}{\text{average lotion load of top 10 wipes in stack}}$$

A saturation profile, or wetness gradient, exists in the stack when the saturation gradient index is greater than 1.0. In cases where the saturation gradient index is significantly greater than 1.0, e.g. over about 1.5, lotion is draining from the top of the stack and settling in the bottom of the container, such that there may be a noticeable difference in the wetness of the topmost fibrous structures or wipes in the stack compared to that of the fibrous structures or wipes nearest the bottom of the stack. For example, a perfect tub of wipes would have a saturation gradient index of 1.0; the bottommost wipes and topmost wipes would maintain equivalent saturation loading during storage. Additional liquid composition would not be needed to supersaturate the wipes in an effort to keep all of the wipes moist, which typically results in the bottommost wipes being soggy.

"Percent moisture" or "% moisture" or "moisture level" as used herein means 100×(the ratio of the mass of water contained in a fibrous structure to the mass of the fibrous structure). The product of the above equation is reported as a %.

"Surface tension" as used herein, refers to the force at the interface between a liquid composition and air. Surface tension is typically expressed in dynes per centimeter (dynes/cm).

"Surfactant" as used herein, refers to materials which preferably orient toward an interface. Surfactants include the various surfactants known in the art, including: nonionic surfactants; anionic surfactants; cationic surfactants; amphoteric surfactants, zwitterionic surfactants; and mixtures thereof.

"Visible" as used herein, refers to being capable of being seen by the naked eye when viewed at a distance of 12 inches (in), or 30.48 centimeters (cm), under the unimpeded light of an ordinary incandescent 60 watt light bulb that is inserted in a fixture such as a table lamp. It follows that "visually distinct" as used herein refers to those features of nonwoven wipes, whether or not they are pre-moistened, that are readily visible and discernable when the wipe is subjected to normal use, such as the cleaning of a child's skin.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

"Total Pore Volume" as used herein means the sum of the fluid holding void volume in each pore range from 2.5 µm to 1000 µm radii as measured according to the Pore Volume Test Method described herein.

"Pore Volume Distribution" as used herein means the distribution of fluid holding void volume as a function of pore radius. The Pore Volume Distribution of a fibrous structure is measured according to the Pore Volume Test Method described herein.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Fibrous Structure

It has surprisingly been found that the textured fibrous structures of the present invention that exhibit novel surface height properties compared to known textured fibrous structures provide consumers with improved actual and/or perceived bowel movement removal during use.

In one example, a textured fibrous structure, for example a textured fibrous structure comprising a plurality of filaments and/or comprising a liquid composition, such as a lotion, according to the present invention comprises at least one surface comprising a plurality of deformations such that the surface exhibits one or more of the following surface height properties:
 a. an average absolute surface height value (Sa) of greater than 250 µm and/or greater than 275 µm and/or greater than 300 µm and/or greater than 325 µm and/or greater than 350 µm and/or greater than 375 µm and/or greater than 400 µm and/or greater than 450 µm and/or greater than 500 µm and/or greater than 525 µm as measured according to the Surface Height Test Method described herein;
 b. a root mean square average surface height value (Sq) of greater than 300 µm and/or greater than 325 µm and/or greater than 350 µm and/or greater than 375 µm and/or greater than 400 µm and/or greater than 450 µm and/or greater than 500 µm and/or greater than 525 µm and/or greater than 575 µm as measured according to the Surface Height Test Method described herein;
 c. a height difference surface height value (Sk) of greater than 825 µm and/or greater than 875 and/or greater than 900 and/or greater than 925 and/or greater than 975 and/or greater than 1000 and/or greater than 1125 and/or greater than 1150 and/or greater than 1200 and/or greater than 1250 and/or greater than 1300 and/or greater than 1350 and/or greater than 1400 and/or greater than 1450 and/or greater than 1500 as measured according to the Surface Height Test Method described herein.

In one example, a textured fibrous structure void of spunbond (i.e., not a textured spunbond/pulp/spunbond fibrous structure), for example a textured coformed fibrous structure, textured spunlaced fibrous structure, or textured airlaid fibrous structure according to the present invention comprises at least one surface comprising a plurality of deformations such that the surface exhibits one or more of the following surface height properties:
 a. an average absolute surface height value (Sa) of greater than 85 µm and/or greater than 90 µm and/or greater than 100 µm and/or greater than 150 µm and/or greater than 200 µm and/or greater than 250 µm and/or greater than 275 µm and/or greater than 300 µm and/or greater than 325 µm and/or greater than 350 µm and/or greater than 375 µm and/or greater than 400 µm and/or greater than 450 µm and/or greater than 500 µm and/or greater than 525 µm as measured according to the Surface Height Test Method described herein;
 b. a root mean square average surface height value (Sq) of greater than 125 µm and/or greater than 150 µm and/or greater than 200 µm and/or greater than 250 µm and/or greater than 300 µm and/or greater than 325 µm and/or greater than 350 µm and/or greater than 375 µm and/or greater than 400 µm and/or greater than 450 µm and/or greater than 500 µm and/or greater than 525 µm and/or greater than 575 µm as measured according to the Surface Height Test Method described herein;
 c. a height difference surface height value (Sk) of greater than 270 µm and/or greater than 300 µm and/or greater than 350 µm and/or greater than 400 µm and/or greater than 450 µm and/or greater than 500 µm and/or greater than 600 µm and/or greater than 700 µm and/or greater than 825 µm and/or greater than 875 and/or greater than 900 and/or greater than 925 and/or greater than 975 and/or greater than 1000 and/or greater than 1125 and/or greater than 1150 and/or greater than 1200 and/or greater than 1250 and/or greater than 1300 and/or greater than 1350 and/or greater than 1400 and/or greater than 1450 and/or greater than 1500 as measured according to the Surface Height Test Method described herein.

In one example, a textured fibrous structure void of pulp, for example a textured spunlaced fibrous structure according to the present invention comprises at least one surface comprising a plurality of deformations such that the surface exhibits one or more of the following surface height properties:
 a. an average absolute surface height value (Sa) of greater than 80 µm and/or greater than 82 µm and/or greater than 85 µm and/or greater than 90 µm and/or greater than 100 µm and/or greater than 150 µm and/or greater than 200 µm and/or greater than 250 µm and/or greater than 275 µm and/or greater than 300 µm and/or greater than 325 µm and/or greater than 350 µm and/or greater than 375 µm and/or greater than 400 µm and/or greater than 450 µm and/or greater than 500 µm and/or greater than 525 µm as measured according to the Surface Height Test Method described herein;
b. a root mean square average surface height value (Sq) of greater than 117 µm and/or greater than 120 µm and/or greater than 125 µm and/or greater than 150 µm and/or greater than 200 µm and/or greater than 250 µm and/or greater than 300 µm and/or greater than 325 µm and/or greater than 350 µm and/or greater than 375 µm and/or greater than 400 µm and/or greater than 450 µm and/or greater than 500 µm and/or greater than 525 µm and/or greater than 575 µm as measured according to the Surface Height Test Method described herein;
c. a height difference surface height value (Sk) of greater than 245 µm and/or greater than 250 µm and/or greater than 300 µm and/or greater than 350 µm and/or greater than 400 µm and/or greater than 450 µm and/or greater than 500 µm and/or greater than 600 µm and/or greater than 700 µm and/or greater than 825 µm and/or greater than 875 and/or greater than 900 and/or greater than 925 and/or greater than 975 and/or greater than 1000 and/or greater than 1125 and/or greater than 1150 and/or greater than 1200 and/or greater than 1250 and/or greater than 1300 and/or greater than 1350 and/or greater than 1400 and/or greater than 1450 and/or greater than 1500 as measured according to the Surface Height Test Method described herein.

In one example, a textured fibrous structure void of filaments, for example a textured airlaid fibrous structure, such as a textured airlaid comprising a liquid composition, such as a lotion, according to the present invention comprises at least one surface comprising a plurality of deformations such that the surface exhibits one or more of the following surface height properties:
a. an average absolute surface height value (Sa) of greater than greater than 60 µm and/or greater than 65 µm and/or greater than 70 µm and/or greater than 75 µm and/or greater than 80 µm and/or greater than 82 µm and/or greater than 85 µm and/or greater than 90 µm and/or greater than 100 µm and/or greater than 150 µm and/or greater than 200 µm and/or greater than 250 µm and/or greater than 275 µm and/or greater than 300 µm and/or greater than 325 µm and/or greater than 350 µm and/or greater than 375 µm and/or greater than 400 µm and/or greater than 450 µm and/or greater than 500 µm and/or greater than 525 µm as measured according to the Surface Height Test Method described herein;
b. a root mean square average surface height value (Sq) of greater than 80 µm and/or greater than 90 µm and/or greater than 100 µm and/or greater than 110 µm and/or greater than 117 µm and/or greater than 120 µm and/or greater than 125 µm and/or greater than 150 µm and/or greater than 200 µm and/or greater than 250 µm and/or greater than 300 µm and/or greater than 325 µm and/or greater than 350 µm and/or greater than 375 µm and/or greater than 400 µm and/or greater than 450 µm and/or greater than 500 µm and/or greater than 525 µm and/or greater than 575 µm as measured according to the Surface Height Test Method described herein;
c. a height difference surface height value (Sk) of greater than 195 µm and/or greater than 200 µm and/or greater than 225 µm and/or greater than 245 µm and/or greater than 250 µm and/or greater than 300 µm and/or greater than 350 µm and/or greater than 400 µm and/or greater than 450 µm and/or greater than 500 µm and/or greater than 600 µm and/or greater than 700 µm and/or greater than 825 µm and/or greater than 875 and/or greater than 900 and/or greater than 925 and/or greater than 975 and/or greater than 1000 and/or greater than 1125 and/or greater than 1150 and/or greater than 1200 and/or greater than 1250 and/or greater than 1300 and/or greater than 1350 and/or greater than 1400 and/or greater than 1450 and/or greater than 1500 as measured according to the Surface Height Test Method described herein.

In another example, the textured fibrous structures are made on and the surface height properties and element characteristics are achieved using a monoplanar collection device, such as a resinous belt, alone or on a support fabric, rather than on a multi-planar woven fabric.

The presence of the deformations on one or more surfaces of the textured fibrous structures of the present invention are such that surface height properties described herein of the textured fibrous structures are produced.

Table 1 below shows surface height property values for comparative examples of fibrous structures, some textured, and inventive examples.

TABLE 1

Figure 1B:
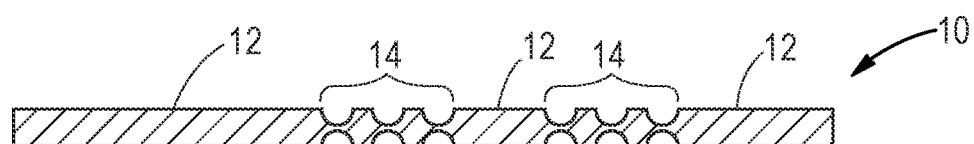
FIG. 1B is a cross-sectional view of FIG. 1A taken along line 1B-1B
Figure 2A:
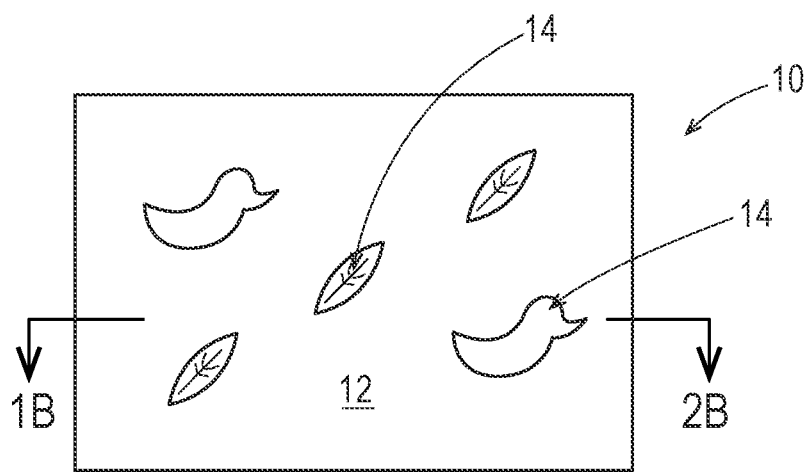
FIG. 2A is a schematic representation of another example of a Prior Art textured fibrous structure.
Figure 2B:
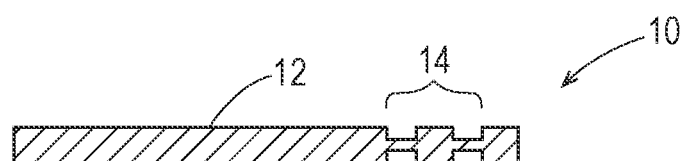
FIG. 2B is a cross-sectional view of FIG. 2A taken along line 2B-2B

| Fibrous Structure | Type | | Sa (µm) | Sq (µm) | Sk (µm) |
|---|---|---|---|---|---|
| Inventive Sample 1 | Spunlaced | 318-Side A | 315.1 | 351.9 | 916.6 |
| | | 318-Side A2 | 285.5 | 319.5 | 833.5 |
| | | 318-Side B | 301.6 | 338.7 | 888.7 |
| | | 318-Side B2 | 234 | 270.1 | 717.2 |
| Inventive Sample 2 | Coformed | 319-Side A | 544.7 | 613.2 | 1533.3 |
| | | 319-Side A2 | 513.6 | 570.1 | 1471.4 |
| | | 319-Side B | 483.3 | 537.4 | 1399.9 |
| | | 319-Side B2 | 478.9 | 530.9 | 1368.3 |
| Inventive Sample 3 | Spunbond/ Pulp/ Spunbond | 321-Side A | 340.8 | 382.5 | 1003.8 |
| | | 321-Side A2 | 344.6 | 387.2 | 1019.1 |
| | | 321-Side B | 328.7 | 370 | 958.4 |
| | | 321-Side B2 | 311.2 | 354.7 | 926.9 |
| Inventive Sample 4 | Airlaid | 322-Side A | 374.9 | 422.8 | 1119.6 |
| | | 322-Side A2 | 387.8 | 436.5 | 1147.2 |
| | | 322-Side B | 377.4 | 426.6 | 1124.1 |
| | | 322-Side B2 | 346.9 | 392.9 | 1029.9 |
| Inventive Sample 5 | Coformed | Side A | 422.5 | 473.6 | 1254.5 |
| | | Side A2 | 385.6 | 435.2 | 1154 |
| | | Side B | 361 | 416.6 | 1114.9 |
| | | Side B2 | 308.5 | 356.9 | 950.8 |
| Inventive Sample 6 | Coformed | 301-Side A | 468.3 | 530.3 | 1386.8 |
| | | 301-Side A2 | 505.5 | 570.6 | 1511.1 |
| | | 301-Side B | 373.3 | 421.9 | 1098.6 |
| | | 301-Side B2 | 388.6 | 439.8 | 1129.8 |
| Inventive Sample 7 | Coformed | 303-Side A | 395 | 441.6 | 1144.3 |
| | | 303-Side A2 | 349.1 | 388.7 | 993 |
| | | 303-Side B | 390.8 | 440.9 | 1167.9 |
| | | 303-Side B2 | 412.6 | 464 | 1218.1 |
| Comparative Sample 1 | Spunbond/ Pulp/ Spunbond | Side A | 234.3 | 282.8 | 782 |
| | | Side A2 | 237.5 | 288.6 | 806.4 |
| | | Side B | 185.7 | 228.9 | 632.6 |
| | | Side B2 | 235.7 | 287.4 | 791.3 |
| Pampers ® (Figs. 1A-1B) | Spunlaced | 318-Flat-Side A | 79.2 | 115.4 | 234.9 |
| | | 318-Flat-Side B | 79.5 | 113.3 | 242.7 |
| Huggies ® Natural Care | Coformed | 319-Flat-Side A | 64.8 | 83.4 | 207.7 |
| | | 319-Flat-Side B | 83.7 | 109.5 | 267.9 |
| Arvell ® | Spunbond/ Pulp/ Spunbond | 321-Flat-Side A | 43.4 | 55.8 | 139.3 |
| | | 321-Flat-Side B | 50.3 | 64.4 | 163.3 |
| 7th Gen ® (Figs. 2A-2B) | Airlaid | 322-Flat-Side A | 59.8 | 75.4 | 194 |
| | | 322-Flat-Side B | 54.3 | 68.5 | 176.1 |

Figure 5:
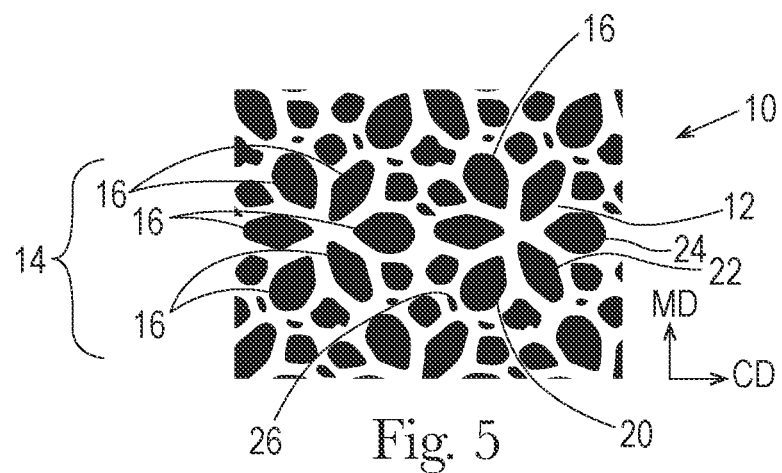
FIG. 5 is a top plan view of another example of a textured fibrous structure according to the present invention.

In one example of the textured fibrous structure of the present invention as shown in FIG. 5, the textured fibrous structure 10, for example a textured fibrous structure comprising a plurality of filaments and/or comprising a liquid composition, such as a lotion, comprises a surface 12 and one or more objects 14 formed by an arrangement of discrete deformations, for example protrusions 16, such as a flower pattern. The opposite surface of this textured fibrous structure 10 comprises a plurality of depressions (not shown) that correspond to the protrusions 16.

Figure 6:
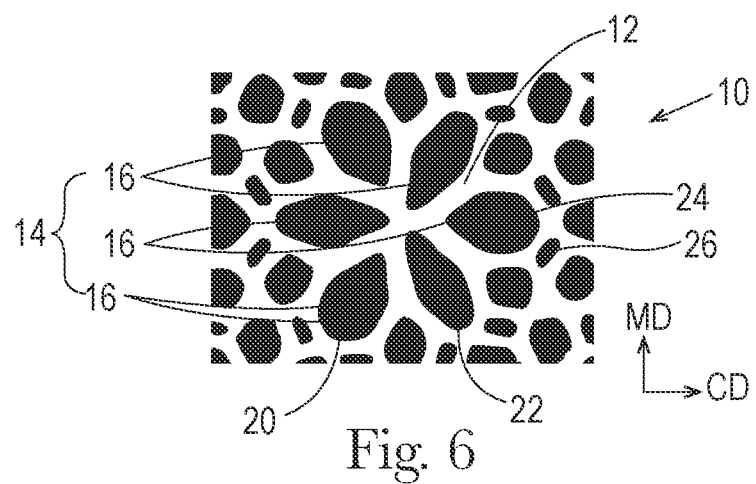
FIG. 6 is a top plan view of another example of a textured fibrous structure according to the present invention.

In another example of the textured fibrous structure of the present invention as shown in FIG. 6, the textured fibrous structure 10, for example a textured fibrous structure comprising a plurality of filaments and/or comprising a liquid composition, such as a lotion, comprises a surface 12 and one or more objects 14 formed by an arrangement of discrete deformations, for example protrusions 16, such as a flower pattern, in this case a larger flower pattern than that shown in FIG. 5. The opposite surface of this textured fibrous structure 10 comprises a plurality of depressions (not shown) that correspond to the protrusions 16.

Figure 7:
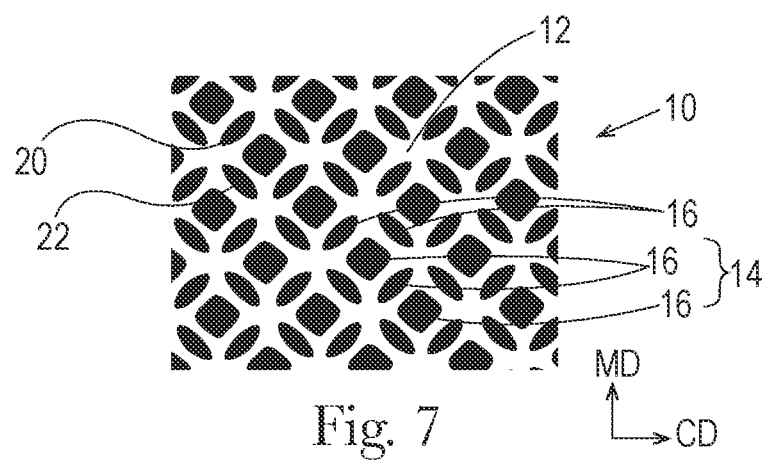
FIG. 7 is a top plan view of another example of a textured fibrous structure according to the present invention.

In still another example of the textured fibrous structure of the present invention as shown in FIG. 7 the textured fibrous structure 10, for example a textured fibrous structure comprising a plurality of filaments and/or comprising a liquid composition, such as a lotion, comprises a surface 12 and one or more objects 14 formed by an arrangement of discrete deformations, for example protrusions 16, such as a coin pattern made up of a center deformation and four surrounding deformations.

As illustrated in FIGS. 5-7, the surface 12 of the textured fibrous structures 10 of the present invention may comprise one or more and/or two or more and/or three or more and/or four or more groups (a group is more than 3 and/or more than 4 and/or more than 5 and/or more than 10 and/or more than 15 and/or more than 20 discrete deformations) of discrete deformations that exhibit different surface height properties and/or exhibit different element characteristics, such as element count (number of elements in a group and/or total number of elements), area, perimeter, length, angle, width, aspect ratio, perimeter to area ratio, and inter-element distances for elements within a group and/or elements in different groups and/or for all elements. In one example, a group of deformations is different from another group of deformations if they are discernible visually and/or mathematically from one another based on surface height and/or element characteristics, such as area. In another example, a group of deformations if the average value of the surface height and/or the element characteristic, for example area, is at least 10% and/or at least 15% and/or at least 20% and/or at least 25% and/or at least 30% and/or at least 40% different from the average value of the surface height of the groups of deformations and/or different from the average value of the element characteristic of the groups of deformations, such as area. A group of elements may exhibit a 10% or less and/or 8% or less and/or 5% or less and/or 3% or less deviation of an element characteristic, such as area, among the elements within the group.

Figure 8:
FIG. 8 is an Element Characterization plot of area for the textured fibrous structure of FIG. 5.
Figure 8:
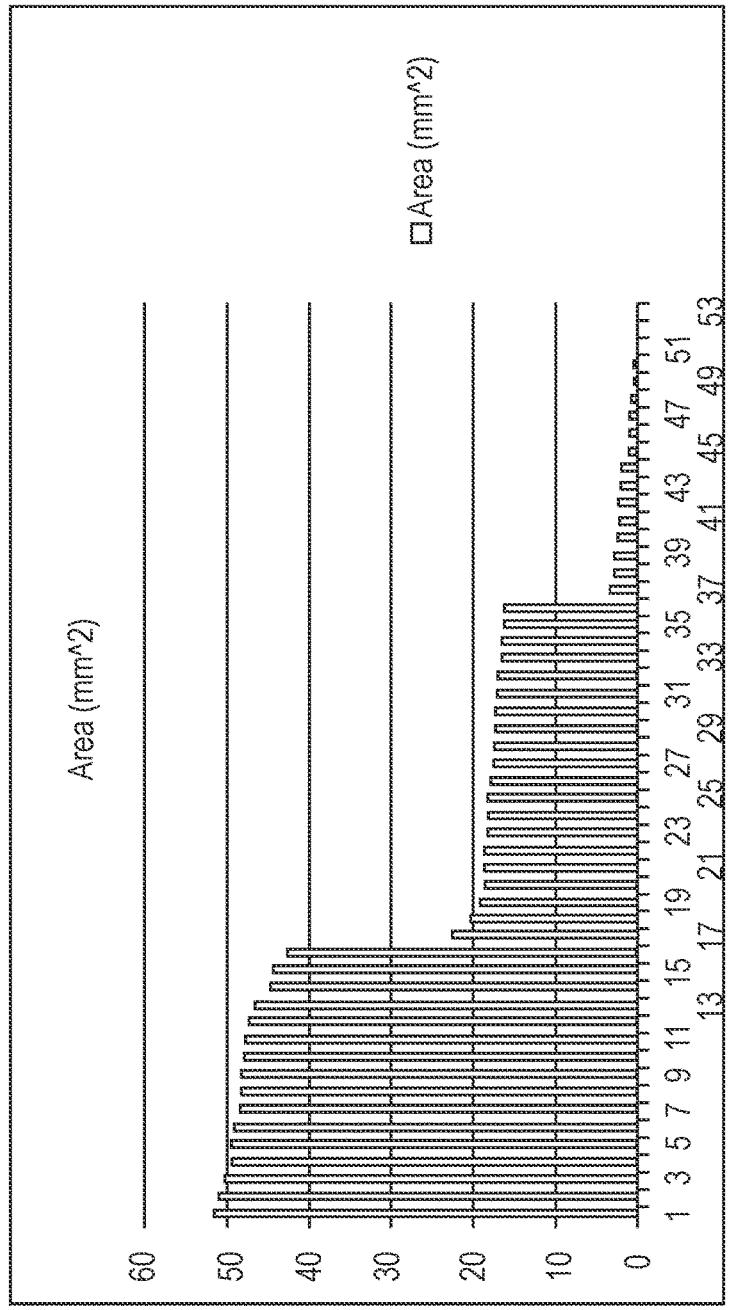
Figure 9:
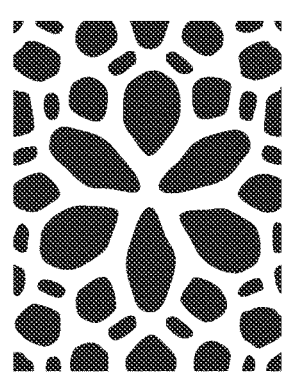
FIG. 9 is an Element Characterization plot of area for the textured fibrous structure of FIG. 6.
Figure 9:
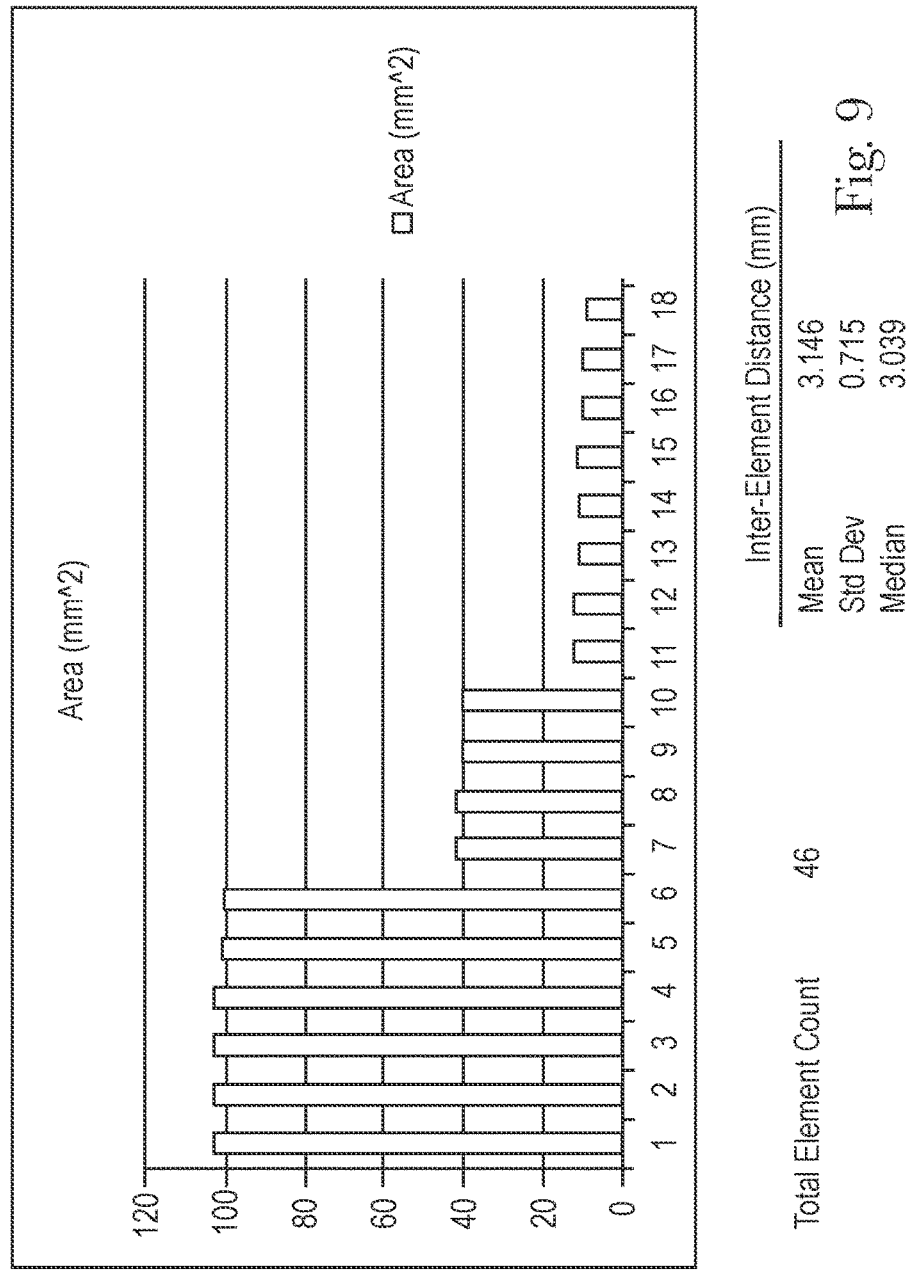
Figure 10:
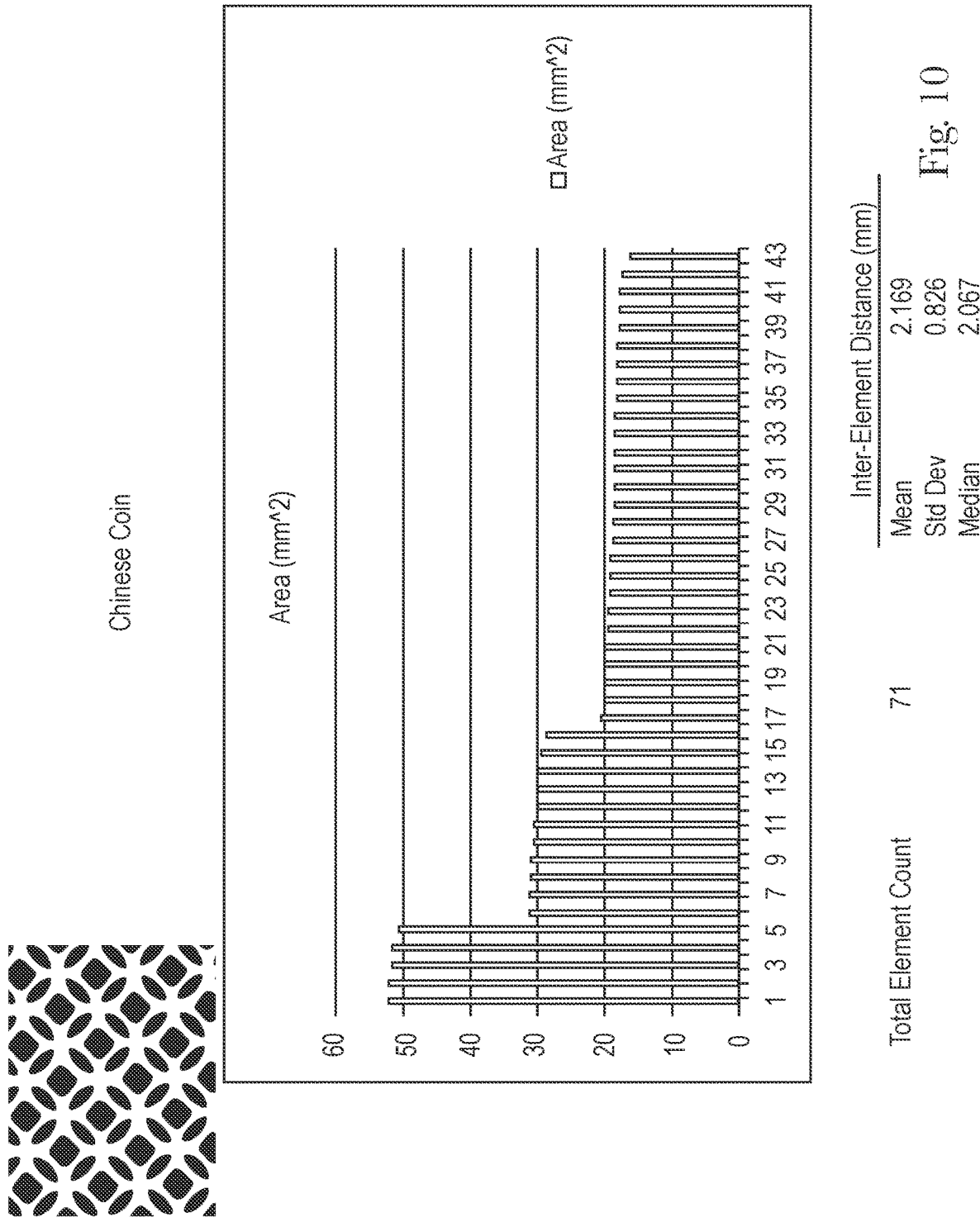
FIG. 10 is an Element Characterization plot of area for the textured fibrous structure of FIG. 7.

FIGS. 8-10 (Textured Fibrous Structures according to the present invention) illustrate this concept. FIG. 8 corresponds to the textured fibrous structure shown in FIG. 5 and clearly shows three or more groups; namely three groups of discrete deformations and thus elements that exhibit different element characteristics, for example areas, such as non-constant areas of discrete deformations between groups and in one example with respect to the elements in general. For example, one group of discrete deformations, the largest elements, exhibit an average area of about 45 mm², another group, the medium sized elements, exhibit an average area of about 18 mm² and the third group, the smallest elements, exhibit an average area of about 3 mm².

FIG. 9 corresponds to the textured fibrous structure shown in FIG. 6 and clearly shows three or more groups; namely three groups of discrete deformations and thus elements that exhibit different element characteristics, for example areas. For example, one group of discrete deformations, the largest elements, exhibit an average area of about 100 mm², another group, the medium sized elements, exhibit an average area of about 40 mm² and the third group, the smallest elements, exhibit an average area of about 9 mm².

FIG. 10 corresponds to the textured fibrous structure shown in FIG. 7 and appears to show three groups of discrete deformations and thus elements that exhibit different element characteristics, for example areas. However, upon review of the area profile and the analysis image it is evident that an artifact of bridging is occurring. One of skill in the art would recognize this bridging effect and discount that apparent group of deformations (in this case, the largest elements). Accordingly, it is clear that FIG. 10 shows two or more groups; namely two groups of discrete deformations and thus elements that exhibit different element characteristics, for example areas. For example, one group of discrete deformations exhibit an average area of about 30 mm², and the other group exhibit an average area of about 19 mm².

FIGS. 8-10 clearly illustrate that the examples of the textured fibrous structure of the present invention shown therein comprise at least one surface comprising greater than 10% and/or greater than 15% and/or greater than 20% and/or greater than 25% and/or greater than 30% and/or greater than 35% of elements that exhibits an average area of greater than 10 mm² and/or greater than 15 mm² and/or greater than 20 mm² and/or greater than 25 mm² and/or greater than 30 mm² as measured according to the Element Characterization Test Method described herein.

In addition to the areas of the elements shown in FIGS. 8-10, FIGS. 8-10 also show that the examples of the textured fibrous structures of the present invention exhibit mean inter-element distances of greater than 1.1 mm and/or greater than 1.2 mm and/or greater than 1.4 mm and/or greater than 1.5 mm and/or greater than 1.7 mm and/or greater than 1.8 mm and/or greater than 2.0 mm and/or greater than 2.2 mm and/or greater than 2.5 mm and/or greater than 2.75 mm and/or greater than 3.0 mm and mean inter-element distance standard deviations of greater than 0.4 and/or greater than 0.5 and/or greater than 0.6 and/or greater than 0.7 and/or greater than 0.75 and/or greater than 0.8 and/or greater than 0.9 and/or greater than 1.0 and/or greater than 1.1 and/or greater than 1.2 as measured according to the Element Characterization Test Method described herein.

In addition to the areas and inter-element distances, the textured fibrous structures 10 of the present invention may comprise a surface 12 comprising discrete deformations, for example discrete protrusions 16, such that discrete deformations are arranged and/or oriented such that three or more and/or four or more and/or five or more different (greater than 10% and/or greater than 15% and/or greater than 20% and/or greater than 25% difference between angles) element angles (referenced as 20, 22, 24, and 26) with respect to the MD, and/or groups of element angles with respect to the MD are present (as shown in FIGS. 5-7) as measured according to the Element Characterization Test Method described herein.

In addition, the textured fibrous structures of the present invention may comprise a surface comprising discrete deformations such that discrete deformations exhibit element areas and element perimeters such that the ratio of element perimeter to element area is 1 or less and/or 0.9 or less and/or 0.8 or less and/or 0.7 or less and/or 0.6 or less as measured according to the Element Characterization Test Method described herein.

The texture fibrous structure of the present invention may comprise a plurality of filaments and fibers commingled together, for example as a coform textured fibrous structure.

At least one of the fibrous elements, for example filaments, within the textured fibrous structure of the present invention may comprise a thermoplastic polymer. The thermoplastic polymer, when present, may be selected from the group consisting of: polyolefins, polyesters, and mixtures thereof. In one example, the thermoplastic polymer is a polyolefin, such as polypropylene and/or polyethylene. In one example, the polyolefin is polypropylene.

The fibers, when present in the textured fibrous structures of the present invention, may comprise pulp fibers, such as wood pulp fibers.

The textured fibrous structures of the present invention may comprise a plurality of filaments, a plurality of solid additives, such as fibers, and a mixture of filaments and solid additives, for example fibers, such as pulp fibers.

FIGS. 11-15 below are meant to show examples of different configurations and/or structures that the textured fibrous structures of the present invention may be produced in. The plurality of deformations on the surface(s) of the textured fibrous structures of the present invention are not explicitly shown in FIGS. 11-15, but are considered to be present for purposes of this application.

Figure 11:
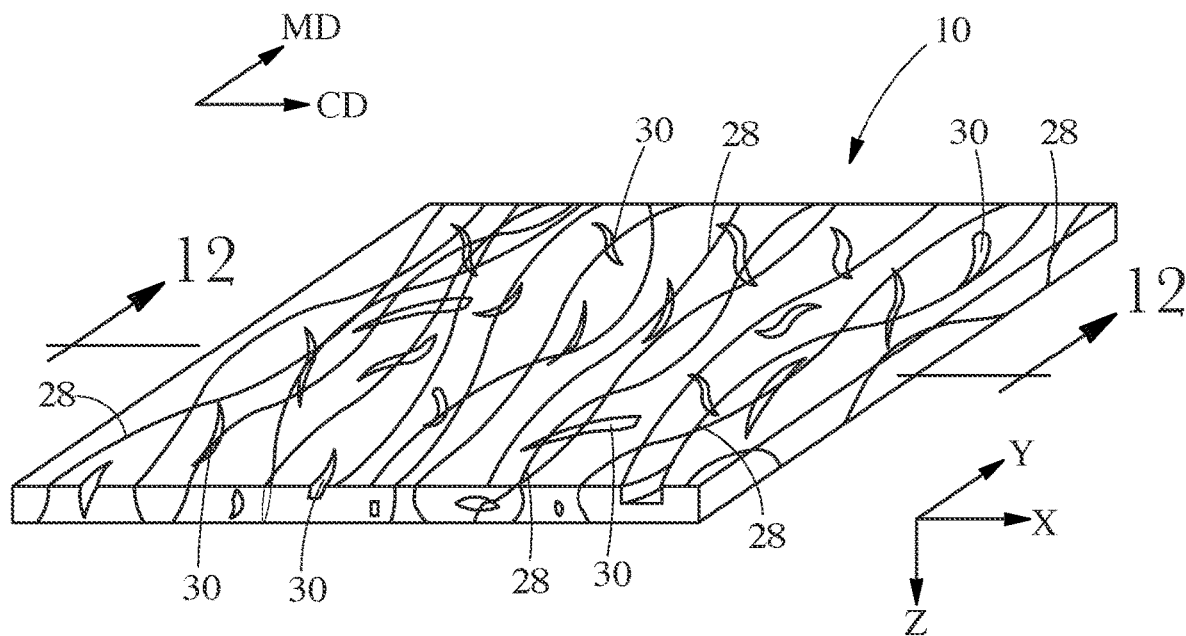
FIG. 11 is a perspective view of an example of a textured fibrous structure according to the present invention.
Figure 12:
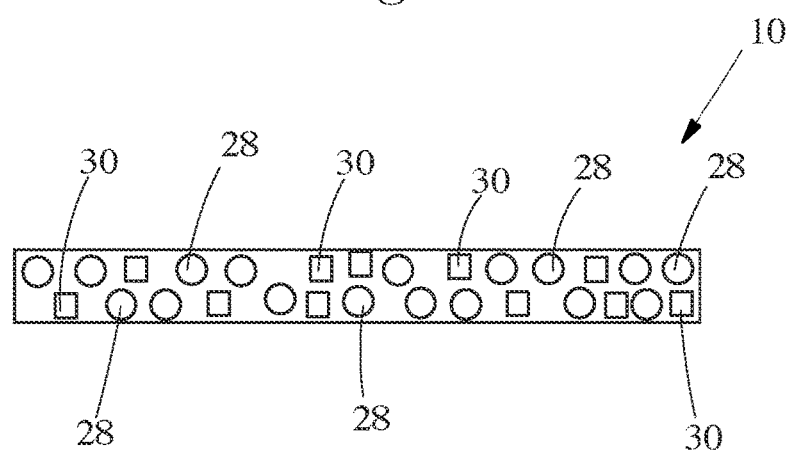
FIG. 12 is a cross-sectional view of FIG. 11 taken along line 12-12.

FIGS. 11 and 12 show schematic representations of an example of a textured fibrous structure in accordance with the present invention. As shown in FIGS. 11 and 12, the textured fibrous structure 10 may be a co-formed fibrous structure. The textured fibrous structure 10 comprises a plurality of filaments 28, such as polypropylene filaments, and a plurality of solid additives, such as wood pulp fibers 30. The filaments 28 may be randomly arranged as a result of the process by which they are spun and/or formed into the textured fibrous structure 10. The wood pulp fibers 30, may be randomly dispersed throughout the textured fibrous structure 10 in the x-y plane. The wood pulp fibers 30 may be non-randomly dispersed throughout the fibrous structure in the z-direction. In one example (not shown), the wood pulp fibers 30 are present at a higher concentration on one or more of the exterior, x-y plane surfaces than within the fibrous structure along the z-direction.

Figure 13:
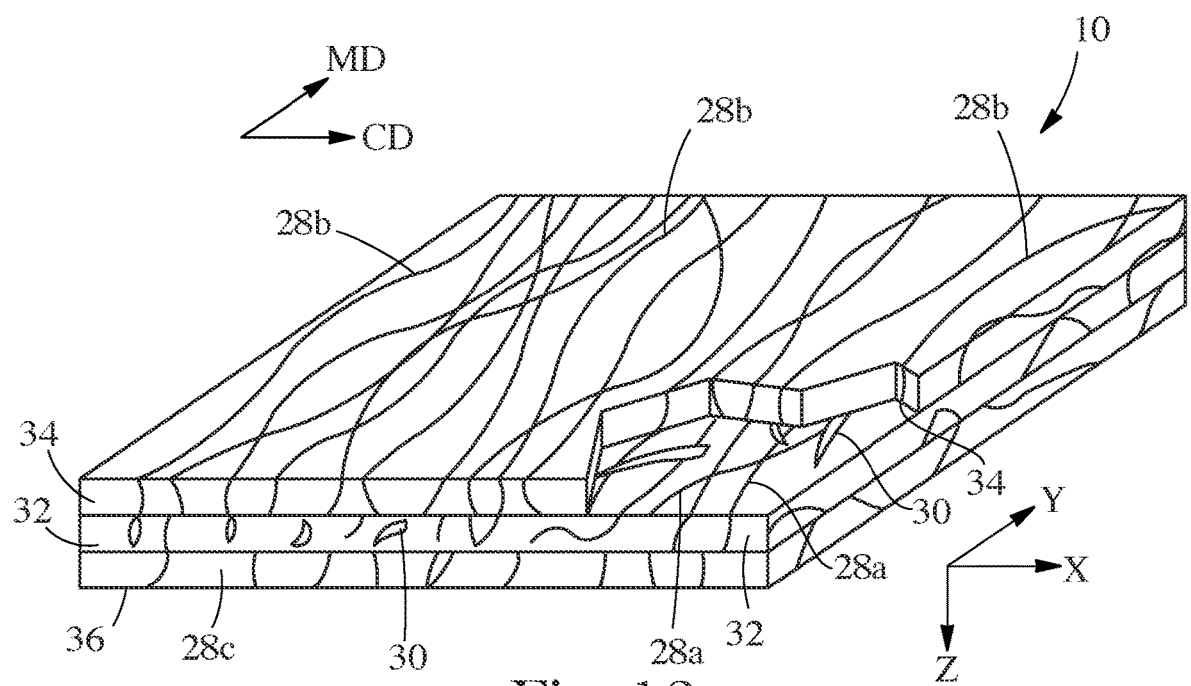
FIG. 13 is a perspective view of another example of a fibrous structure according to the present invention.

As shown in FIG. 13, another example of a fibrous structure in accordance with the present invention is a layered textured fibrous structure 10. The layered textured fibrous structure 10 comprises a first layer 32 comprising a plurality of filaments 28a, such as polypropylene filaments, and a plurality of solid additives, in this example, wood pulp fibers 30. The layered textured fibrous structure 10 further comprises a second layer 34 comprising a plurality of filaments 28b, such as polypropylene filaments. In one example, the first and second layers 32, 34, respectively, are sharply defined zones of concentration of the filaments and/or solid additives. The plurality of filaments 28b may be deposited directly onto a surface of the first layer 32 to form a layered textured fibrous structure that comprises the first and second layers 32, 34, respectively.

Further, the layered textured fibrous structure 10 may comprise a third layer 36, as shown in FIG. 13. The third layer 36 may comprise a plurality of filaments 28c, which may be the same or different from the filaments 28b and/or 28a in the second 34 and/or first 32 layers, respectively. As a result of the addition of the third layer 36, the first layer 32 is positioned, for example sandwiched, between the second layer 34 and the third layer 36. The plurality of filaments 28c may be deposited directly onto a surface of the first layer 32, opposite from the second layer 34, to form the layered textured fibrous structure 10 that comprises the first, second and third layers 32, 34, 36, respectively. The second and third layers 34, 36 may function as a scrim material in the layered textured fibrous structure 10.

Figure 14:
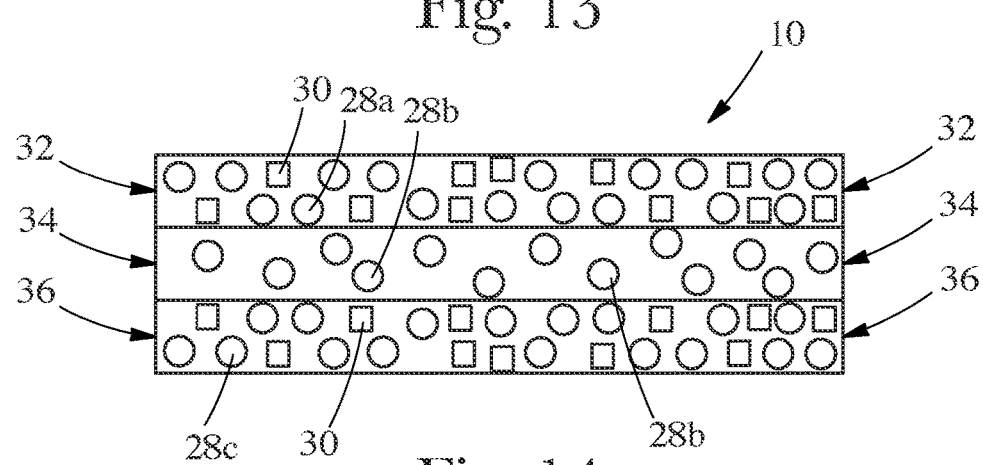
FIG. 14 is a cross-sectional view of another example of a fibrous structure according to the present invention.

As shown in FIG. 14, a cross-sectional schematic representation of another example of a textured fibrous structure in accordance with the present invention comprising a layered textured fibrous structure 10 comprising a first layer 32, a second layer 34 and optionally a third layer 36. The first layer 32 comprises a plurality of filaments 28a, such as polypropylene filaments, and a plurality of solid additives, such as wood pulp fibers 30. The second layer 34 may comprise any suitable filaments, solid additives and/or polymeric films. In one example, the second layer 34 comprises a plurality of filaments 28b. In one example, the filaments 28b comprise a polymer selected from the group consisting of: polysaccharides, polysaccharide derivatives, polyvinylalcohol, polyvinylalcohol derivatives and mixtures thereof.

In yet another example, a textured fibrous structure of the present invention may comprise two outer layers consisting of 100% by weight filaments and an inner layer consisting of 100% by weight fibers.

In another example of a textured fibrous structure in accordance with the present invention, instead of being layers of fibrous structure 10, the material forming layers 32, 34, and 36, may be in the form of plies wherein two or more of the plies may be combined to form a textured fibrous structure. The plies may be bonded together, such as by thermal bonding and/or adhesive bonding, to form a multiply textured fibrous structure.

Figure 15:
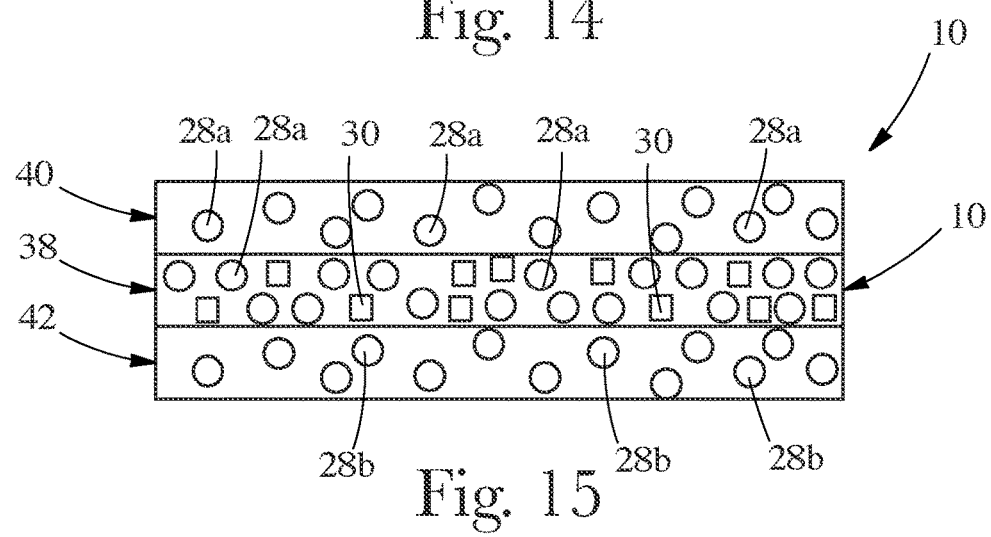
FIG. 15 is a cross-sectional view of another example of a fibrous structure according to the present invention.

Another example of a textured fibrous structure of the present invention in accordance with the present invention is shown in FIG. 15. The textured fibrous structure 10 may comprise two or more plies, wherein one ply 38 comprises any suitable textured fibrous structure in accordance with the present invention, for example textured fibrous structure 10 as shown and described in FIGS. 11 and 12 and another ply 40 comprising any suitable fibrous structure, for example a fibrous structure comprising filaments 28a, such as polypropylene filaments. The fibrous structure of ply 40 may be in the form of a net and/or mesh and/or other structure that comprises pores that expose one or more portions of the textured fibrous structure 10 to an external environment and/or at least to liquids that may come into contact, at least initially, with the fibrous structure of ply 40. In addition to ply 40, the textured fibrous structure 10 may further comprise ply 42. Ply 42 may comprise a fibrous structure comprising filaments 28b, such as polypropylene filaments, and may be the same or different from the fibrous structure of ply 40.

Two or more of the plies 38, 40, and 42 may be bonded together, such as by thermal bonding and/or adhesive bonding, to form a multi-ply fibrous structure. After a bonding operation, especially a thermal bonding operation, it may be difficult to distinguish the plies of the textured fibrous structure 10 and the textured fibrous structure 10 may visually and/or physically be a similar to a layered fibrous structure in that one would have difficulty separating the once individual plies from each other. In one example, ply 38 may comprise a textured fibrous structure that exhibits a basis weight of at least about 15 g/m² and/or at least about 20 g/m² and/or at least about 25 g/m² and/or at least about 30 g/m² up to about 120 g/m² and/or 100 g/m² and/or 80 g/m² and/or 60 g/m² and the plies 40 and 42, when present, independently and individually, may comprise fibrous structures that exhibit basis weights of less than about 10 g/m² and/or less than about 7 g/m² and/or less than about 5 g/m² and/or less than about 3 g/m² and/or less than about 2 g/m² and/or to about 0 g/m² and/or 0.5 g/m².

Plies 40 and 42, when present, may help retain the solid additives, in this case the wood pulp fibers 30, on and/or within the textured fibrous structure of ply 38 thus reducing lint and/or dust (as compared to a single-ply fibrous structure comprising the textured fibrous structure of ply 38 without the plies 40 and 42) resulting from the wood pulp fibers 30 becoming free from the textured fibrous structure of ply 38.

The textured fibrous structures of the present invention may comprise any suitable amount of filaments and any suitable amount of solid additives. For example, the textured fibrous structures may comprise from about 10% to about 70% and/or from about 20% to about 60% and/or from about 30% to about 50% by dry weight of the textured fibrous structure of filaments and from about 90% to about 30% and/or from about 80% to about 40% and/or from about 70% to about 50% by dry weight of the textured fibrous structure of solid additives, such as wood pulp fibers. In one example, the textured fibrous structures of the present invention comprise filaments.

The filaments and solid additives of the present invention may be present in the textured fibrous structures according to the present invention at weight ratios of filaments to solid additives of from at least about 1:1 and/or at least about 1:1.5 and/or at least about 1:2 and/or at least about 1:2.5 and/or at least about 1:3 and/or at least about 1:4 and/or at least about 1:5 and/or at least about 1:7 and/or at least about 1:10.

The textured fibrous structures of the present invention and/or any sanitary tissue products comprising such fibrous structures may be subjected to any post-processing operations such as embossing operations, printing operations, tuft-generating operations, thermal bonding operations, ultrasonic bonding operations, perforating operations, surface treatment operations such as application of lotions, silicones and/or other materials, folding, and mixtures thereof.

Non-limiting examples of suitable polypropylenes for making the filaments of the present invention are commercially available from Lyondell-Basell and Exxon-Mobil.

Any hydrophobic or non-hydrophilic materials within the fibrous structure, such as polypropylene filaments, may be surface treated and/or melt treated with a hydrophilic modifier. Non-limiting examples of surface treating hydrophilic modifiers include surfactants, such as Triton X-100. Non-limiting examples of melt treating hydrophilic modifiers that are added to the melt, such as the polypropylene melt, prior to spinning filaments, include hydrophilic modifying melt additives such as VW351 and/or S-1416 commercially available from Polyvel, Inc. and Irgasurf commercially available from Ciba. The hydrophilic modifier may be associated with the hydrophobic or non-hydrophilic material at any suitable level known in the art. In one example, the hydrophilic modifier is associated with the hydrophobic or non-hydrophilic material at a level of less than about 20% and/or less than about 15% and/or less than about 10% and/or less than about 5% and/or less than about 3% to about 0% by dry weight of the hydrophobic or non-hydrophilic material.

The textured fibrous structures of the present invention may include optional additives, each, when present, at individual levels of from about 0% and/or from about 0.01% and/or from about 0.1% and/or from about 1% and/or from about 2% to about 95% and/or to about 80% and/or to about 50% and/or to about 30% and/or to about 20% by dry weight of the fibrous structure. Non-limiting examples of optional additives include permanent wet strength agents, temporary wet strength agents, dry strength agents such as carboxymethylcellulose and/or starch, softening agents, lint reducing agents, opacity increasing agents, wetting agents, odor absorbing agents, perfumes, temperature indicating agents, color agents, dyes, osmotic materials, microbial growth detection agents, antibacterial agents and mixtures thereof.

The textured fibrous structure of the present invention may itself be a sanitary tissue product. It may be convolutedly wound about a core to form a roll. It may be combined with one or more other fibrous structures as a ply to form a multi-ply sanitary tissue product. In one example, a co-formed fibrous structure of the present invention may be convolutedly wound about a core to form a roll of co-formed sanitary tissue product. The rolls of sanitary tissue products may also be coreless.

The textured fibrous structures of the present invention may exhibit a Liquid Absorptive Capacity of at least 2.5 g/g and/or at least 4.0 g/g and/or at least 7 g/g and/or at least 12 g/g and/or at least 13 g/g and/or at least 13.5 g/g and/or to about 30.0 g/g and/or to about 20 g/g and/or to about 15.0 g/g as measured according to the Liquid Absorptive Capacity Test Method described herein.

The textured fibrous structures of the present invention may exhibit a pore volume distribution such that at least 2% and/or at least 9% and/or at least 10% and/or at least 12% and/or at least 17% and/or at least 18% and/or at least 28% and/or at least 32% and/or at least 43% of the total pore volume present in the textured fibrous structure exists in pores of radii of from 91 μm to 140 μm as measured by the Pore Volume Distribution Test Method described herein.

The textured fibrous structures of the present invention may exhibit a pore volume distribution such that at least 2% and/or at least 9% and/or at least 10% and/or at least 12% and/or at least 17% and/or at least 18% and/or at least 20% and/or at least 28% and/or at least 32% and/or at least 43% of the total pore volume present in the textured fibrous structure exists in pores of radii of from 91 μm to 120 μm and/or exhibit a pore volume distribution such that less than 50% and/or less than 45% and/or less than 40% and/or less than 38% and/or less than 35% and/or less than 30% of the total pore volume present in the textured fibrous structure exists in pores of radii of from 101 μm to 200 μm as measured by the Pore Volume Distribution Test Method described herein. In one example, the textured fibrous structures of the present invention exhibit a pore volume distribution such that at least 20% and/or at least 28% and/or at least 32% and/or at least 43% of the total pore volume present in the textured fibrous structure exists in pores of radii of from 91 μm to 120 μm and exhibit a pore volume distribution such that less than 40% and/or less than 38% and/or less than 35% and/or less than 30% of the total pore volume present in the textured fibrous structure exists in pores of radii of from 101 μm to 200 μm as measured by the Pore Volume Distribution Test Method described herein.

The textured fibrous structures of the present invention may exhibit a pore volume distribution such that at least 2% and/or at least 9% and/or at least 10% and/or at least 12% and/or at least 17% and/or at least 18% and/or at least 20% and/or at least 28% and/or at least 32% and/or at least 43% of the total pore volume present in the fibrous structure exists in pores of radii of from 91 μm to 140 μm and/or exhibit a pore volume distribution such that less than 50% and/or less than 45% and/or less than 40% and/or less than 38% and/or less than 35% and/or less than 30% of the total pore volume present in the textured fibrous structure exists in pores of radii of from 101 μm to 200 μm and/or exhibit a pore volume distribution such that less than 50% and/or less than 45% and/or less than 40% and/or less than 38% and/or less than 35% and/or less than 30% of the total pore volume present in the textured fibrous structure exists in pores of radii of from 121 μm to 200 μm as measured by the Pore Volume Distribution Test Method described herein. In another example, the textured fibrous structures of the present invention exhibit a pore volume distribution such that at least 43% of the total pore volume present in the textured fibrous structure exists in pores of radii of from 91 μm to 140 μm and exhibit a pore volume distribution less than 40% and/or less than 38% and/or less than 35% and/or less than 30% of the total pore volume present in the textured fibrous structure exists in pores of radii of from 101 μm to 200 μm and exhibit a pore volume distribution less than 40% and/or less than 38% and/or less than 35% and/or less than 30% of the total pore volume present in the fibrous structure exists in pores of radii of from 121 μm to 200 μm as measured by the Pore Volume Distribution Test Method described herein.

The textured fibrous structures of the present invention may exhibit a pore volume distribution such that at least 2% and/or at least 9% and/or at least 10% and/or at least 12% and/or at least 17% and/or at least 18% and/or at least 20% and/or at least 28% and/or at least 32% and/or at least 43% of the total pore volume present in the textured fibrous structure exists in pores of radii of from 91 μm to 140 μm and/or exhibit a pore volume distribution such that less than 50% and/or less than 45% and/or less than 40% and/or less than 38% and/or less than 35% and/or less than 30% of the total pore volume present in the textured fibrous structure exists in pores of radii of from 101 μm to 200 μm as measured by the Pore Volume Distribution Test Method described herein. In another example, the textured fibrous structures of the present invention exhibit a pore volume distribution such that at least 43% of the total pore volume present in the textured fibrous structure exists in pores of radii of from 91 μm to 140 μm and exhibit a pore volume distribution less than 40% and/or less than 38% and/or less than 35% and/or less than 30% of the total pore volume present in the textured fibrous structure exists in pores of radii of from 101 μm to 200 μm as measured by the Pore Volume Distribution Test Method described herein.

The textured fibrous structure of the present invention may exhibit at least a bi-modal pore volume distribution (i.e., the pore volume distribution exhibits at least two modes).

The deformations on the surface(s) of the textured fibrous structures of the present invention may provide the textured fibrous structures with a different pressure mapping profile that what has been achievable in the past as measured according to the Pressure Mapping Test Method described herein.

Wipe

The textured fibrous structures, as described above, may be utilized to form a wipe. "Wipe" may be a general term to describe a piece of material, generally non-woven material, used in cleansing hard surfaces, food, inanimate objects, toys and body parts. In particular, many currently available wipes may be intended for the cleansing of the perianal area after defecation. Other wipes may be available for the cleansing of the face or other body parts. Multiple wipes may be attached together by any suitable method to form a mitt.

The material from which a wipe is made should be strong enough to resist tearing during normal use, yet still provide softness to the user's skin, such as a child's tender skin. Additionally, the material should be at least capable of retaining its form for the duration of the user's cleansing experience.

Wipes may be generally of sufficient dimension to allow for convenient handling. Typically, the wipe may be cut and/or folded to such dimensions as part of the manufacturing process. In some instances, the wipe may be cut into individual portions so as to provide separate wipes which are often stacked and interleaved in consumer packaging. In other embodiments, the wipes may be in a web form where the web has been slit and folded to a predetermined width and provided with means (e.g., perforations) to allow individual wipes to be separated from the web by a user. Suitably, an individual wipe may have a length between about 100 mm and about 250 mm and a width between about 140 mm and about 250 mm. In one embodiment, the wipe may be about 200 mm long and about 180 mm wide and/or about 180 mm long and about 180 mm wide and/or about 170 mm long and about 180 mm wide and/or about 160 mm long and about 175 mm wide. The material of the wipe may generally be soft and flexible, potentially having a structured surface to enhance its cleaning performance.

It is also within the scope of the present invention that the wipe may be a laminate of two or more materials. Commercially available laminates, or purposely built laminates would be within the scope of the present invention. The laminated materials may be joined or bonded together in any suitable fashion, such as, but not limited to, ultrasonic bonding, adhesive, glue, fusion bonding, heat bonding, thermal bonding and combinations thereof. In another alternative embodiment of the present invention the wipe may be a laminate comprising one or more layers of nonwoven materials and one or more layers of film. Examples of such optional films, include, but are not limited to, polyolefin films, such as, polyethylene film. An illustrative, but non-limiting example of a nonwoven material which is a laminate is a laminate of a 16 gsm nonwoven polypropylene and a 0.8 mm 20 gsm polyethylene film.

The wipes may also be treated to improve the softness and texture thereof by processes such as hydroentanglement or spunlacing. The wipes may be subjected to various treatments, such as, but not limited to, physical treatment, such as ring rolling, as described in U.S. Pat. No. 5,143,679; structural elongation, as described in U.S. Pat. No. 5,518,801; consolidation, as described in U.S. Pat. Nos. 5,914,084, 6,114,263, 6,129,801 and 6,383,431; stretch aperturing, as described in U.S. Pat. Nos. 5,628,097, 5,658,639 and 5,916,661; differential elongation, as described in WO Publication No. 2003/0028165A1; and other solid state formation technologies as described in U.S. Publication No. 2004/0131820A1 and U.S. Publication No. 2004/0265534A1 and zone activation and the like; chemical treatment, such as, but not limited to, rendering part or all of the substrate hydrophobic, and/or hydrophilic, and the like; thermal treatment, such as, but not limited to, softening of fibers by heating, thermal bonding and the like; and combinations thereof.

Wet wipes, such as baby wipes for example, should be strong enough when pre-moistened with a lotion to maintain integrity in use, but also soft enough to give a pleasing and comfortable tactile sensation to the user(s). In addition, wet wipes should have sufficient absorbency and porosity to be effective in cleaning the soiled skin of a user while at the same time providing sufficient barrier to protect the user from contacting the soil. Protecting the user from contacting the soil, which may be measured according to the Soil Leak Through Test Method described herein, creates unique "barrier" demands for fibrous structures that can negatively affect both the fibrous structures' absorbency and lotion release, which may be measured by the Lotion Release Test Method described herein. Moreover, wet wipes should have absorbency properties such that each wipe of a stack remains wet during extended storage periods but yet at the same time easily releases lotion during use.

The wipe may exhibit a pore volume distribution such that at least 43% and/or at least 45% and/or at least 50% and/or at least 55% and/or at least 60% and/or at least 75% of the total pore volume present in the fibrous structures exists in pores of radii of from 91 μm to about 140 μm as determined by the Pore Volume Distribution Test Method described herein The wipe may exhibit a pore volume distribution such that at least 30% and/or at least 40% and/or at least 50% and/or at least 55% and/or at least 60% and/or at least 75% of the total pore volume present in the fibrous structures exists in pores of radii of from about 121 μm to about 200 μm as determined by the Pore Volume Distribution Test Method described herein The wipe may exhibit a pore volume distribution such that at least 50% and/or at least 55% and/or at least 60% and/or at least 75% of the total pore volume present in the fibrous structures exists in pores of radii of from about 101 μm to about 200 μm as determined by the Pore Volume Distribution Test Method described herein The wipe may exhibit a pore volume distribution such that at least 30% and/or at least 40% and/or at least 50% and/or at least 55% and/or at least 60% and/or at least 75% of the total pore volume present in the fibrous structures exists in pores of radii of from about 121 μm to about 200 μm as determined by the Pore Volume Distribution Test Method described herein and exhibit a pore volume distribution such that at least 50% and/or at least 55% and/or at least 60% and/or at least 75% of the total pore volume present in the fibrous structures exists in pores of radii of from about 101 μm to about 200 μm as determined by the Pore Volume Distribution Test Method described herein The wipe may exhibit a pore volume distribution such that at least 30% and/or at least 40% and/or at least 50% and/or at least 55% and/or at least 60% and/or at least 75% of the total pore volume present in the fibrous structures exists in pores of radii of from about 121 μm to about 200 μm as determined by the Pore Volume Distribution Test Method described herein and exhibit a pore volume distribution such that at least 50% and/or at least 55% and/or at least 60% and/or at least 75% of the total pore volume present in the fibrous structures exists in pores of radii of from about 101 μm to about 200 μm as determined by the Pore Volume Distribution Test Method described herein.

The wipe may have a basis weight of at least about 30 grams/m$^2$ and/or at least about 35 grams/m$^2$ and/or at least about 40 grams/m$^2$. In one example, the wipe may have a basis weight of at least about 45 grams/m$^2$. In another example, the wipe basis weight may be less than about 100 grams/m$^2$. In another example, wipes may have a basis weight between about 45 grams/m$^2$ and about 75 grams/m$^2$, and in yet another embodiment a basis weight between about 45 grams/m$^2$ and about 65 grams/m$^2$.

In another example of the present invention the wipe may be biodegradable. For example the wipe could be made from a biodegradable material such as a polyesteramide, or high wet strength cellulose.

In one example of the present invention, the textured fibrous structure comprises a pre-moistened wipe, such as a baby wipe. A plurality of the pre-moistened wipes may be stacked one on top of the other and may be contained in a container, such as a plastic tub or a film wrapper. In one example, the stack of pre-moistened wipes (typically about 40 to 80 wipes/stack) may exhibit a height of from about 50 to about 300 mm and/or from about 75 to about 125 mm. The pre-moistened wipes may comprise a liquid composition, such as a lotion. The pre-moistened wipes may be stored long term in a stack in a liquid impervious container or film pouch without all of the lotion draining from the top of the stack to the bottom of the stack. The pre-moistened wipes may exhibit a Liquid Absorptive Capacity of at least 2.5 g/g and/or at least 4.0 g/g and/or at least 7 g/g and/or at least 12 g/g and/or at least 13 g/g and/or at least 13.5 g/g and/or to about 30.0 g/g and/or to about 20 g/g and/or to about 15.0 g/g as measured according to the Liquid Absorptive Capacity Test Method described herein.

In another example, the pre-moistened wipes may exhibit a saturation loading (g liquid composition to g of dry wipe) of from about 1.5 to about 6.0 g/g. The liquid composition may exhibit a surface tension of from about 20 to about 35 and/or from about 28 to about 32 dynes/cm. The pre-moistened wipes may exhibit a dynamic absorption time (DAT) from about 0.01 to about 0.4 and/or from about 0.01 to about 0.2 and/or from about 0.03 to about 0.1 seconds as measured according to the Dynamic Absorption Time Test Method described herein.

In one example, the pre-moistened wipes are present in a stack of pre-moistened wipes that exhibits a height of from about 50 to about 300 mm and/or from about 75 to about 200 mm and/or from about 75 to about 125 mm, wherein the stack of pre-moistened wipes exhibits a saturation gradient index of from about 1.0 to about 2.0 and/or from about 1.0 to about 1.7 and/or from about 1.0 to about 1.5.

The wipes may be saturation loaded with a liquid composition to form a pre-moistened fibrous structure or wipe. The loading may occur individually, or after the fibrous structures or wipes are place in a stack, such as within a liquid impervious container or packet. In one example, the pre-moistened wipes may be saturation loaded with from about 1.5 g to about 6.0 g and/or from about 2.5 g to about 4.0 g of liquid composition per g of wipe.

The wipes may be placed in the interior of a container, which may be liquid impervious, such as a plastic tub or a sealable packet, for storage and eventual sale to the consumer. The wipes may be folded and stacked. The wipes of the present invention may be folded in any of various known folding patterns, such as C-folding, Z-folding and quarter-folding. Use of a Z-fold pattern may enable a folded stack of wipes to be interleaved with overlapping portions. Alternatively, the wipes may include a continuous strip of material which has perforations between each wipe and which may be arranged in a stack or wound into a roll for dispensing, one after the other, from a container, which may be liquid impervious.

The wipes may further comprise prints, which may provide aesthetic appeal. Non-limiting examples of prints include figures, patterns, letters, pictures and combinations thereof.

Method for Making a Textured Fibrous Structure

The textured fibrous structures of the present invention may be made by subjecting any suitable fibrous structure, such as a fibrous structure comprising a plurality of filaments, to a deformation-creating process that creates a plurality of discrete deformations into one or more of the surfaces of the fibrous structure such that a textured fibrous structure according to the present invention is formed. Non-limiting examples of suitable fibrous structures that can be used as the starting material to form the textured fibrous structures of the present invention include, but are not limited to, coform fibrous structures, meltblown fibrous structures, spunbond fibrous structures, spunbond/pulp/spunbond fibrous structures, meltblown/pulp/meltblown fibrous structures, spunlace fibrous structures, and airlaid fibrous structures.

The deformations may be imparted to one or more surfaces of the fibrous structure by passing the fibrous structure through a nip formed by a rubber roll (heated—hot or unheated—cold) and a patterned belt or patterned roll that comprises deflection conduits into which portions of the rubber roll flow to create deformations in the fibrous structure. The pressure in the nip must be sufficient enough to form the deformations in at least one surface of the fibrous structure such that a resulting textured fibrous structure according to the present invention is formed. In another example a steel roll (heated—hot) may be used in place of the rubber roll. In still another example, a fibrous structure is placed between a patterned plate, such as a metal plate, and a rubber plate and pressed at a pressure of greater than 100 psi and/or greater than 250 psi and/or greater than 400 psi and/or greater than 500 psi and/or greater than 750 psi and/or greater than 1000 psi and/or greater than 1250 psi and/or greater than 1400 psi. The patterned plate and/or rubber plate may be heated to a temperature of greater than 60° C. and/or greater than 75° C. and/or greater than 100° C. and/or greater than 110° C. and/or greater than 125° C. and/or greater than 135° C. The fibrous structure may be subjected to a preheating operation prior to entering the deformation generating operation.

Non-Limiting Example of Processes for Making a Textured Fibrous Structure of the Present Invention Example 1—Textured Coformed Fibrous Structure The following coform textured fibrous structure is manufactured on a pilot line in a two-pass, direct forming process as follows: 1) making an unconsolidated coformed core layer; 2) depositing a first scrim layer on a first surface of the coformed core layer; 3) depositing a second scrim layer on the other side of the coformed core layer; 4) bonding the coformed core layer and scrim layers construct to form a coformed fibrous structure; and 5) subjecting the coformed fibrous structure to a deformation generating operation to produce a textured coformed fibrous structure.

1. Making Coformed Core Layer—A 21%:27.5%:47.5%: 4% blend, respectively, of PH835 polypropylene (Lyondell-Basell, London, UK): Metocene MF650W polypropylene (LyondellBasell, London, UK): Metocene MF650X (LyondellBasell, London, UK): White 412951 (Ampacet Corporation, Tarrytown, N.Y.) whitening agent/opacifier is dry blended, to form a melt blend. The melt blend is heated to about 405° F. through a melt extruder. A 15.5 inch wide Biax 12 row spinnerette with 192 nozzles per cross-direction inch, commercially available from Biax Fiberfilm Corporation, is utilized. 40 nozzles per cross-direction inch of the 192 nozzles have a 0.018 inch inside diameter melt outlet hole while the remaining nozzles are plugged, i.e., there is no opening in the nozzle. Approximately 0.18 grams per (open) hole per minute (ghm) of the melt blend is extruded from the open nozzles to form meltblown filaments from the melt blend. Approximately 415 SCFM of compressed air is heated such that the air has a temperature of about 395° F. at the spinnerette. Approximately 500 g/minute of Golden Isle (from Georgia Pacific) 4825 semi-treated SSK pulp (Georgia-Pacific, Atlanta, Ga.) is defibrated through a hammermill to form SSK wood pulp fibers. Approximately 2100 SCFM Air at a temperature of about 80° F. and about 75% relative humidity (RH) is drawn into the hammermill. The pulp is conveyed, for example as described in copending U.S. Pat. App. Nos. 62/094,087 filed Dec. 19, 2014 and 62/170,176 filed Jun. 3, 2015, using a motive air mass flow of approximately 1200 SCFM via two solid additive spreaders. The solid additive spreaders turns the pulp fibers and distributes the pulp fibers in the cross-direction such that the pulp fibers are injected into the stream of meltblown filaments at a 45° angle through two 4 inch×15 inch cross-direction (CD) slots. The pulp conveying ductwork and geometry may be as described in copending U.S. Pat. App. Ser. Nos. 62/170,169 and 62/170,172 both filed Jun. 3, 2015. A forming box surrounds the area where the meltblown filaments and pulp fibers are commingled. This forming box is designed to reduce the amount of air allowed to enter or escape from this commingling area. The forming box, for example may be as described in U.S. Pat. App. Ser. Nos. 62/094,089 filed Dec. 19, 2014 and 62/170,179 filed Jun. 3, 2015. A forming vacuum pulls air through a moving collection surface, such as a non-patterned forming belt or through-air-drying fabric, thus collecting and accumulating the commingled meltblown filaments and pulp fibers to form a fibrous structure batt. An example of such a fabric is Albany International Electrotech F541-28I. The forming vacuum level is adjusted to prevent excessive air from escaping from the forming box. The fibrous structure batt formed by this process comprises about 77% by dry fibrous structure weight of pulp and about 23% by dry fibrous structure weight of meltblown filaments. The line speed is adjusted to accumulate the fiber/filament blend to reach the desired basis weight. The unconsolidated fibrous structure batt is considered the core layer for this example, and the core layer is gathered on a storage roll for later unwinding.

2. First Scrim Layer—A 21%: 27.5%: 47.5%: 4% blend, respectively, of PH835 polypropylene (LyondellBasell, London, UK): Metocene MF650W polypropylene (LyondellBasell, London, UK): PP3546 polypropylene (ExxonMobil, Irving, Tex.): White 412951 whitening agent/opacifier (Ampacet Corporation, Tarrytown, N.Y.). The resin blend is heated to 400° F. in a melt extruder. The melt extruder is used to feed the heated resin blend to a 15.5 inch wide Biax 12 row spinneret with 192 holes per cross-direction inch (Biax Fiberfilm Corporation, Greenville, Wis.) having 8 holes of the 192 holes per cross-direction inch with a 0.018 inch inside diameter melt outlet hole while the remaining nozzles are plugged. The resin blend throughput in the spinneret is 0.18 grams per (open) hole per minute (ghm), i.e., 22.32 grams resin/minute through the spinneret. Compressed attenuating air is supplied to the spinneret at a rate of 426 SCFM, heated such that it is at a temperature of 395° F. at the spinneret. The attenuated filaments are water mist quenched using 2 misting nozzles, one on each broad side of the filament stream, each supplied with air at 35 psig and sufficient water supply for a flow rate of 2.5 gallons/hour. Following mist quenching, the filaments are directed to a first foraminous belt supplied with vacuum, operating horizontally and carrying the previously-formed coformed core layer (unwound from its storage roll) and controlled to move at a machine direction speed of 92 feet/minute; the filaments are accumulated over the coformed core layer on a first surface thereof to form the first scrim layer at a basis weight of approximately 2 gsm.

3. Second Scrim Layer—A second scrim layer is formed by producing meltblown filaments in the same manner as for the first scrim layer as described above. Except the previously-made coformed core layer and overlying first scrim layer are released from the first foraminous belt, turned 90° on a roller, and passed to a second foraminous belt operating vertically (also supplied with vacuum and moving at 92 feet/minute), to carry the coformed core layer and overlying first scrim layer, with the first scrim layer in facing contact with the second foraminous belt. The filaments for the second scrim layer are directed toward the second foraminous belt and the exposed coformed core layer surface, to directly form a second scrim layer overlying the exposed coformed core layer surface.

4. Bonding—Following assembly of the three layers first scrim layer/coformed core layer/second scrim layer of the fibrous structure as described above, they are conveyed to a nip between a pair of calendar bonding rollers. One bonding roller, which is heated to 250° F. at its surface, has pattern of bonding protrusions machined thereon having a bonding area of 6.2 percent. As they pass through the nip, the layers are consolidated in the z-direction and thermally bonded in the pattern to form a thermally bonded coformed fibrous structure.

5. Deformation Generating Operation—The unconsolidated thermally bonded coformed fibrous structure is then subjected to a deformation generating operation that results in a plurality of deformations, for example protrusions and/or depressions, being generated on one or more surfaces of the thermally bonded coformed fibrous structure by placing the thermally bonded coformed fibrous structure between a patterned metal plate, for example one of the patterns shown in FIGS. 5-7, and a rubber plate and pressed at a pressure of about 1500 psi wherein the plates are heated to a temperature of about 138° C. for a time sufficient to generate deformations in the surface(s) of the thermally bonded coformed fibrous structure that results in a textured coformed fibrous structure according the present invention.

Example 2—Textured Coformed Fibrous Structure

The following coform textured fibrous structure is manufactured on a pilot line in a two-pass, direct forming process as follows: 1) making a consolidated coformed core layer; 2) depositing a first scrim layer on a first surface of the coformed core layer; 3) depositing a second scrim layer on the other side of the coformed core layer; 4) bonding the coformed core layer and scrim layers construct to form a coformed fibrous structure; and 5) subjecting the coformed fibrous structure to a deformation generating operation to produce a textured coformed fibrous structure.

1. Making Coformed Core Layer—A 21%:27.5%47.5%: 4% blend, respectively, of PH835 polypropylene (Lyondell-Basell, London, UK): Metocene MF650W polypropylene (LyondellBasell, London, UK): Metocene MF650X (LyondellBasell, London, UK): White 412951 (Ampacet Corporation, Tarrytown, N.Y.) whitening agent/opacifier is dry blended, to form a melt blend. The melt blend is heated to about 405° F. through a melt extruder. A 15.5 inch wide Biax 12 row spinnerette with 192 nozzles per cross-direction inch, commercially available from Biax Fiberfilm Corporation, is utilized. 40 nozzles per cross-direction inch of the 192 nozzles have a 0.018 inch inside diameter melt outlet hole while the remaining nozzles are plugged, i.e., there is no opening in the nozzle. Approximately 0.18 grams per (open) hole per minute (ghm) of the melt blend is extruded from the open nozzles to form meltblown filaments from the melt blend. Approximately 415 SCFM of compressed air is heated such that the air has a temperature of about 395° F. at the spinnerette. Approximately 500 g/minute of Golden Isle (from Georgia Pacific) 4825 semi-treated SSK pulp (Georgia-Pacific, Atlanta, Ga.) is defibrated through a hammermill to form SSK wood pulp fibers. Approximately 2100 SCFM Air at a temperature of about 80° F. and about 75% relative humidity (RH) is drawn into the hammermill. The pulp is conveyed, for example as described in copending U.S. Pat. App. Nos. 62/094,087 filed Dec. 19, 2014 and 62/170,176 filed Jun. 3, 2015, using a motive air mass flow of approximately 1200 SCFM via two solid additive spreaders. The solid additive spreaders turns the pulp fibers and distributes the pulp fibers in the cross-direction such that the pulp fibers are injected into the stream of meltblown filaments at a 45° angle through two 4 inch×15 inch cross-direction (CD) slots. The pulp conveying ductwork and geometry may be as described in copending U.S. Pat. App. Ser. Nos. 62/170,169 and 62/170,172 both filed Jun. 3, 2015. A forming box surrounds the area where the meltblown filaments and pulp fibers are commingled. This forming box is designed to reduce the amount of air allowed to enter or escape from this commingling area. The forming box, for example may be as described in U.S. Pat. App. Ser. Nos. 62/094,089 filed Dec. 19, 2014 and 62/170,179 filed Jun. 3, 2015. A forming vacuum pulls air through a moving collection surface, such as a non-patterned forming belt or through-air-drying fabric, thus collecting and accumulating the commingled meltblown filaments and pulp fibers to form a fibrous structure batt. An example of such a fabric is Albany International Electrotech F541-28I. The forming vacuum level is adjusted to prevent excessive air from escaping from the forming box. The fibrous structure batt formed by this process comprises about 77% by dry fibrous structure weight of pulp and about 23% by dry fibrous structure weight of meltblown filaments. The line speed is adjusted to accumulate the fiber/filament blend to reach the desired basis weight. The fibrous structure batt while carried on the fabric is then consolidated by passing it through a pair of calender rollers under a pressure of 40 psi and at a temperature of about 275°, forming a core layer, and the core layer is gathered on a storage roll for later unwinding.

2. First Scrim Layer—A 21%: 27.5%: 47.5%: 4% blend, respectively, of PH835 polypropylene (LyondellBasell, London, UK): Metocene MF650W polypropylene (LyondellBasell, London, UK): PP3546 polypropylene (ExxonMobil, Irving, Tex.): White 412951 whitening agent/opacifier (Ampacet Corporation, Tarrytown, N.Y.). The resin blend is heated to 400° F. in a melt extruder. The melt extruder is used to feed the heated resin blend to a 15.5 inch wide Biax 12 row spinneret with 192 holes per cross-direction inch (Biax Fiberfilm Corporation, Greenville, Wis.) having 8 holes of the 192 holes per cross-direction inch with a 0.018 inch inside diameter melt outlet hole while the remaining nozzles are plugged. The resin blend throughput in the spinneret is 0.18 grams per (open) hole per minute (ghm), i.e., 22.32 grams resin/minute through the spinneret. Compressed attenuating air is supplied to the spinneret at a rate of 426 SCFM, heated such that it is at a temperature of 395° F. at the spinneret. The attenuated filaments are water mist quenched using 2 misting nozzles, one on each broad side of the filament stream, each supplied with air at 35 psig and sufficient water supply for a flow rate of 2.5 gallons/hour. Following mist quenching, the filaments are directed to a first foraminous belt supplied with vacuum, operating horizontally and carrying the previously-formed coformed core layer (unwound from its storage roll) and controlled to move at a machine direction speed of 92 feet/minute; the filaments are accumulated over the coformed core layer on a first surface thereof to form the first scrim layer at a basis weight of approximately 2 gsm.

3. Second Scrim Layer—A second scrim layer is formed by producing meltblown filaments in the same manner as for the first scrim layer as described above. Except the previously-made coformed core layer and overlying first scrim layer are released from the first foraminous belt, turned 90° on a roller, and passed to a second foraminous belt operating vertically (also supplied with vacuum and moving at 92 feet/minute), to carry the coformed core layer and overlying first scrim layer, with the first scrim layer in facing contact with the second foraminous belt. The filaments for the second scrim layer are directed toward the second foraminous belt and the exposed coformed core layer surface, to directly form a second scrim layer overlying the exposed coformed core layer surface.

4. Bonding—Following assembly of the three layers first scrim layer/coformed core layer/second scrim layer of the fibrous structure as described above, they are conveyed to a nip between a pair of calendar bonding rollers. One bonding roller, which is heated to 250° F. at its surface, has pattern of bonding protrusions machined thereon having a bonding area of 6.2 percent. As they pass through the nip, the layers are consolidated in the z-direction and thermally bonded in the pattern to form a thermally bonded coformed fibrous structure.

5. Deformation Generating Operation—The consolidated thermally bonded coformed fibrous structure is then subjected to a deformation generating operation that results in a plurality of deformations, for example protrusions and/or depressions, being generated on one or more surfaces of the thermally bonded coformed fibrous structure by placing the thermally bonded coformed fibrous structure between a patterned metal plate, for example one of the patterns shown in FIGS. 5-7, and a rubber plate and pressed at a pressure of about 1500 psi wherein the plates are heated to a temperature of about 138° C. for a time sufficient to generate deformations in the surface(s) of the thermally bonded coformed fibrous structure that results in a textured coformed fibrous structure according the present invention.

Example 3—Textured Coformed Fibrous Structure

The following coform textured fibrous structure is manufactured on a pilot line in a two-pass, direct forming process as follows: 1) making an unconsolidated coformed core layer; 2) depositing a first scrim layer on a first surface of the coformed core layer; 3) depositing a second scrim layer on the other side of the coformed core layer; 4) bonding the coformed core layer and scrim layers construct to form a coformed fibrous structure; and 5) subjecting the coformed fibrous structure to a deformation generating operation to produce a textured coformed fibrous structure.

1. Making Coformed Core Layer—A 21%:27.5%47.5%: 4% blend, respectively, of PH835 polypropylene (Lyondell-Basell, London, UK): Metocene MF650W polypropylene (LyondellBasell, London, UK): Metocene MF650X (LyondellBasell, London, UK): White 412951 (Ampacet Corporation, Tarrytown, N.Y.) whitening agent/opacifier is dry blended, to form a melt blend. The melt blend is heated to about 405° F. through a melt extruder. A 15.5 inch wide Biax 12 row spinnerette with 192 nozzles per cross-direction inch, commercially available from Biax Fiberfilm Corporation, is utilized. 40 nozzles per cross-direction inch of the 192 nozzles have a 0.018 inch inside diameter melt outlet hole while the remaining nozzles are plugged, i.e., there is no opening in the nozzle. Approximately 0.18 grams per (open) hole per minute (ghm) of the melt blend is extruded from the open nozzles to form meltblown filaments from the melt blend. Approximately 415 SCFM of compressed air is heated such that the air has a temperature of about 395° F. at the spinnerette. Approximately 500 g/minute of Golden Isle (from Georgia Pacific) 4825 semi-treated SSK pulp (Georgia-Pacific, Atlanta, Ga.) is defibrated through a hammermill to form SSK wood pulp fibers. Approximately 2100 SCFM Air at a temperature of about 80° F. and about 75% relative humidity (RH) is drawn into the hammermill. The pulp is conveyed, for example as described in copending U.S. Pat. App. Nos. 62/094,087 filed Dec. 19, 2014 and 62/170,176 filed Jun. 3, 2015, using a motive air mass flow of approximately 1200 SCFM via two solid additive spreaders. The solid additive spreaders turns the pulp fibers and distributes the pulp fibers in the cross-direction such that the pulp fibers are injected into the stream of meltblown filaments at a 45° angle through two 4 inch×15 inch cross-direction (CD) slots. The pulp conveying ductwork and geometry may be as described in copending U.S. Pat. App. Ser. Nos. 62/170,169 and 62/170,172 both filed Jun. 3, 2015. A forming box surrounds the area where the meltblown filaments and pulp fibers are commingled. This forming box is designed to reduce the amount of air allowed to enter or escape from this commingling area. The forming box, for example may be as described in U.S. Pat. App. Ser. Nos. 62/094,089 filed Dec. 19, 2014 and 62/170,179 filed Jun. 3, 2015. A forming vacuum pulls air through a moving collection surface, such as a non-patterned forming belt or through-air-drying fabric, thus collecting and accumulating the commingled meltblown filaments and pulp fibers to form a fibrous structure batt. An example of such a fabric is Albany International Electrotech F541-28I. The forming vacuum level is adjusted to prevent excessive air from escaping from the forming box. The fibrous structure batt formed by this process comprises about 77% by dry fibrous structure weight of pulp and about 23% by dry fibrous structure weight of meltblown filaments. The line speed is adjusted to accumulate the fiber/filament blend to reach the desired basis weight. The unconsolidated fibrous structure batt is considered the core layer for this example, and the core layer is gathered on a storage roll for later unwinding.

2. First Scrim Layer—A 21%: 27.5%: 47.5%: 4% blend, respectively, of PH835 polypropylene (LyondellBasell, London, UK): Metocene MF650W polypropylene (LyondellBasell, London, UK): PP3546 polypropylene (ExxonMobil, Irving, Tex.): White 412951 whitening agent/opacifier (Ampacet Corporation, Tarrytown, N.Y.). The resin blend is heated to 400° F. in a melt extruder. The melt extruder is used to feed the heated resin blend to a 15.5 inch wide Biax 12 row spinneret with 192 holes per cross-direction inch (Biax Fiberfilm Corporation, Greenville, Wis.) having 8 holes of the 192 holes per cross-direction inch with a 0.018 inch inside diameter melt outlet hole while the remaining nozzles are plugged. The resin blend throughput in the spinneret is 0.18 grams per (open) hole per minute (ghm), i.e., 22.32 grams resin/minute through the spinneret. Compressed attenuating air is supplied to the spinneret at a rate of 426 SCFM, heated such that it is at a temperature of 395° F. at the spinneret. The attenuated filaments are water mist quenched using 2 misting nozzles, one on each broad side of the filament stream, each supplied with air at 35 psig and sufficient water supply for a flow rate of 2.5 gallons/hour. Following mist quenching, the filaments are directed to a first foraminous belt supplied with vacuum, operating horizontally and carrying the previously-formed coformed core layer (unwound from its storage roll) and controlled to move at a machine direction speed of 92 feet/minute; the filaments are accumulated over the coformed core layer on a first surface thereof to form the first scrim layer at a basis weight of approximately 2 gsm.

3. Second Scrim Layer—A second scrim layer is formed by producing meltblown filaments in the same manner as for the first scrim layer as described above. Except the previously-made coformed core layer and overlying first scrim layer are released from the first foraminous belt, turned 90° on a roller, and passed to a second foraminous belt operating vertically (also supplied with vacuum and moving at 92 feet/minute), to carry the coformed core layer and overlying first scrim layer, with the first scrim layer in facing contact with the second foraminous belt. The filaments for the second scrim layer are directed toward the second foraminous belt and the exposed coformed core layer surface, to directly form a second scrim layer overlying the exposed coformed core layer surface.

4. Bonding—Following assembly of the three layers first scrim layer/coformed core layer/second scrim layer of the fibrous structure as described above, they are conveyed to a nip between a pair of calendar bonding rollers. One bonding roller, which is heated to 250° F. at its surface, has pattern of bonding protrusions machined thereon having a bonding area of 6.2 percent. As they pass through the nip, the layers are consolidated in the z-direction and thermally bonded in the pattern to form a thermally bonded coformed fibrous structure.

5. Deformation Generating Operation—The unconsolidated thermally bonded coformed fibrous structure is then subjected to a deformation generating operation that results in a plurality of deformations, for example protrusions and/or depressions, being generated on one or more surfaces of the thermally bonded coformed fibrous structure by placing the thermally bonded coformed fibrous structure between two plates (Plate A and Plate B). In one example, Plate A has a texture and Plate B is flat. Plate A and Plate B could be both made of metal, or polymer, or one another, or other materials. Plate A and Plate B could be both hot, or cold, or one another. In another example, both Plate A and Plate B have textures. The textures of Plate A and Plate B can be same or different. For the case that both Plate A and Plate B have the same textures, the textures of Plate A and Plate B could be aligned or be off from each other during consolidation. Plate A and Plate B could be both made of metal, or polymer, or one another, or other materials. Plate A and Plate B could be both hot, or cold, or one another. The pattern on Plate A and/or Plate B may be one of the patterns shown in FIGS. 5-7. A press is applied to the plates at a pressure of about 1500 psi wherein the plates are heated to a temperature of about 138° C. for a time sufficient to generate deformations in the surface(s) of the thermally bonded coformed fibrous structure that results in a textured coformed fibrous structure according the present invention.

Example 4—Textured Coformed Fibrous Structure

The following coform textured fibrous structure is manufactured on a pilot line in a two-pass, direct forming process as follows: 1) making a consolidated coformed core layer; 2) depositing a first scrim layer on a first surface of the coformed core layer; 3) depositing a second scrim layer on the other side of the coformed core layer; 4) bonding the coformed core layer and scrim layers construct to form a coformed fibrous structure; and 5) subjecting the coformed fibrous structure to a deformation generating operation to produce a textured coformed fibrous structure.

1. Making Coformed Core Layer—A 21%:27.5%47.5%:4% blend, respectively, of PH835 polypropylene (LyondellBasell, London, UK): Metocene MF650W polypropylene (LyondellBasell, London, UK): Metocene MF650X (LyondellBasell, London, UK): White 412951 (Ampacet Corporation, Tarrytown, N.Y.) whitening agent/opacifier is dry blended, to form a melt blend. The melt blend is heated to about 405° F. through a melt extruder. A 15.5 inch wide Biax 12 row spinnerette with 192 nozzles per cross-direction inch, commercially available from Biax Fiberfilm Corporation, is utilized. 40 nozzles per cross-direction inch of the 192 nozzles have a 0.018 inch inside diameter melt outlet hole while the remaining nozzles are plugged, i.e., there is no opening in the nozzle. Approximately 0.18 grams per (open) hole per minute (ghm) of the melt blend is extruded from the open nozzles to form meltblown filaments from the melt blend. Approximately 415 SCFM of compressed air is heated such that the air has a temperature of about 395° F. at the spinnerette. Approximately 500 g/minute of Golden Isle (from Georgia Pacific) 4825 semi-treated SSK pulp (Georgia-Pacific, Atlanta, Ga.) is defibrated through a hammermill to form SSK wood pulp fibers. Approximately 2100 SCFM Air at a temperature of about 80° F. and about 75% relative humidity (RH) is drawn into the hammermill. The pulp is conveyed, for example as described in copending U.S. Pat. App. Nos. 62/094,087 filed Dec. 19, 2014 and 62/170,176 filed Jun. 3, 2015, using a motive air mass flow of approximately 1200 SCFM via two solid additive spreaders. The solid additive spreaders turns the pulp fibers and distributes the pulp fibers in the cross-direction such that the pulp fibers are injected into the stream of meltblown filaments at a 45° angle through two 4 inch×15 inch cross-direction (CD) slots. The pulp conveying ductwork and geometry may be as described in copending U.S. Pat. App. Ser. Nos. 62/170,169 and 62/170,172 both filed Jun. 3, 2015. A forming box surrounds the area where the meltblown filaments and pulp fibers are commingled. This forming box is designed to reduce the amount of air allowed to enter or escape from this commingling area. The forming box, for example may be as described in U.S. Pat. App. Ser. Nos. 62/094,089 filed Dec. 19, 2014 and 62/170,179 filed Jun. 3, 2015. A forming vacuum pulls air through a moving collection surface, such as a non-patterned forming belt or through-air-drying fabric, thus collecting and accumulating the commingled meltblown filaments and pulp fibers to form a fibrous structure batt. An example of such a fabric is Albany International Electrotech F541-28I. The forming vacuum level is adjusted to prevent excessive air from escaping from the forming box. The fibrous structure batt formed by this process comprises about 77% by dry fibrous structure weight of pulp and about 23% by dry fibrous structure weight of meltblown filaments. The line speed is adjusted to accumulate the fiber/filament blend to reach the desired basis weight. The fibrous structure batt while carried on the fabric is then consolidated by passing it through a pair of calender rollers under a pressure of 40 psi and at a temperature of about 275°, forming a core layer, and the core layer is gathered on a storage roll for later unwinding.

2. First Scrim Layer—A 21%: 27.5%: 47.5%: 4% blend, respectively, of PH835 polypropylene (LyondellBasell, London, UK): Metocene MF650W polypropylene (LyondellBasell, London, UK): PP3546 polypropylene (ExxonMobil, Irving, Tex.): White 412951 whitening agent/opacifier (Ampacet Corporation, Tarrytown, N.Y.). The resin blend is heated to 400° F. in a melt extruder. The melt extruder is used to feed the heated resin blend to a 15.5 inch wide Biax 12 row spinneret with 192 holes per cross-direction inch (Biax Fiberfilm Corporation, Greenville, Wis.) having 8 holes of the 192 holes per cross-direction inch with a 0.018 inch inside diameter melt outlet hole while the remaining nozzles are plugged. The resin blend throughput in the spinneret is 0.18 grams per (open) hole per minute (ghm), i.e., 22.32 grams resin/minute through the spinneret. Compressed attenuating air is supplied to the spinneret at a rate of 426 SCFM, heated such that it is at a temperature of 395° F. at the spinneret. The attenuated filaments are water mist quenched using 2 misting nozzles, one on each broad side of the filament stream, each supplied with air at 35 psig and sufficient water supply for a flow rate of 2.5 gallons/hour. Following mist quenching, the filaments are directed to a first foraminous belt supplied with vacuum, operating horizontally and carrying the previously-formed coformed core layer (unwound from its storage roll) and controlled to move at a machine direction speed of 92 feet/minute; the filaments are accumulated over the coformed core layer on a first surface thereof to form the first scrim layer at a basis weight of approximately 2 gsm.

3. Second Scrim Layer—A second scrim layer is formed by producing meltblown filaments in the same manner as for the first scrim layer as described above. Except the previously-made coformed core layer and overlying first scrim layer are released from the first foraminous belt, turned 90° on a roller, and passed to a second foraminous belt operating vertically (also supplied with vacuum and moving at 92 feet/minute), to carry the coformed core layer and overlying first scrim layer, with the first scrim layer in facing contact with the second foraminous belt. The filaments for the second scrim layer are directed toward the second foraminous belt and the exposed coformed core layer surface, to directly form a second scrim layer overlying the exposed coformed core layer surface.

4. Bonding—Following assembly of the three layers first scrim layer/coformed core layer/second scrim layer of the fibrous structure as described above, they are conveyed to a nip between a pair of calendar bonding rollers. One bonding roller, which is heated to 250° F. at its surface, has pattern of bonding protrusions machined thereon having a bonding area of 6.2 percent. As they pass through the nip, the layers are consolidated in the z-direction and thermally bonded in the pattern to form a thermally bonded coformed fibrous structure.

5. Deformation Generating Operation—The consolidated thermally bonded coformed fibrous structure is then subjected to a deformation generating operation that results in a plurality of deformations, for example protrusions and/or depressions, being generated on one or more surfaces of the thermally bonded coformed fibrous structure by placing the thermally bonded coformed fibrous structure between two plates (Plate A and Plate B). In one example, Plate A has a texture and Plate B is flat. Plate A and Plate B could be both made of metal, or polymer, or one another, or other materials. Plate A and Plate B could be both hot, or cold, or one another. In another example, both Plate A and Plate B have textures. The textures of Plate A and Plate B can be same or different. For the case that both Plate A and Plate B have the same textures, the textures of Plate A and Plate B could be aligned or be off from each other during consolidation. Plate A and Plate B could be both made of metal, or polymer, or one another, or other materials. Plate A and Plate B could be both hot, or cold, or one another. The pattern on Plate A and/or Plate B may be one of the patterns shown in FIGS. 5-7. A press is applied to the plates at a pressure of about 1500 psi wherein the plates are heated to a temperature of about 138° C. for a time sufficient to generate deformations in the surface(s) of the thermally bonded coformed fibrous structure that results in a textured coformed fibrous structure according the present invention.

Example 5—Textured Airlaid Fibrous Structure

An airlaid fibrous structure may be made by any suitable airlaying process, for example by depositing individual fibers on a formaminous surface via an airlaid device. These fibers can include, but are not limited to traditional pulp fibers, staple fibers, thermoplastic, and bicomponent fibers. After the individual fibers are laid on the foraminous surface they are bound together by any suitable means. The application and subsequent drying of liquid latex, for example, is used in the production of Latex Bonded Air Laid (LBAL) fibrous structures. Thermal bonding of the fibrous structure via heat and pressure consolidating thermoplastic fibers laid down in the beginning of the process creates Thermal Bonded Air Laid (TBAL) fibrous structures. A combination of the LBAL and TBAL processes creates Multi-Bonded Air Laid (MBAL) fibrous structures.

The airlaid fibrous structure is then subjected to a deformation generating operation that results in a plurality of deformations, for example protrusions and/or depressions, being generated on one or more surfaces of the airlaid fibrous structure by placing the airlaid fibrous structure between a patterned metal plate, for example one of the patterns shown in FIGS. 5-7, and a rubber plate and pressed at a pressure of about 1500 psi wherein the plates are heated to a temperature of about 138° C. for a time sufficient to generate deformations in the surface(s) of the airlaid fibrous structure that results in a textured airlaid fibrous structure according the present invention.

Example 6—Textured Spunlaced Fibrous Structure

A spunlaced fibrous structure may be made by any suitable spunlacing process, for example by mixing staple fibers. The staple fibers are formed into a web of a desired basis weight by using carding technology well known in the industry, for example a Double Excelle Vario three-doffer card from NSC Nonwoven, 59336 TOURCOING CEDEX, France. The carded webs are then consolidated by using hydroentanglement technology well known in the industry, for example a JETlace®3000 from Rieter Perfojet (F-38330 Montbonnot—France) with a working width of 500 mm, with or without hydromolding. The hydroentanglement system has a pre-wetting conveyor and three cylinders with two injectors each. In total three injectors (two on the first cylinder and one on the second cylinder) are used for consolidation and strength generation. Each jet is equipped with 120 micron strips with 42 holes/inch. The webs are dried by using through air drying technology well known in the industry, for example a PERFOdry3000 with a roll diameter of 2000 mm from Rieter Perfojet, to form a spunlaced fibrous structure.

The spunlaced fibrous structure is then subjected to a deformation generating operation that results in a plurality of deformations, for example protrusions and/or depressions, being generated on one or more surfaces of the spunlaced fibrous structure by placing the spunlaced fibrous structure between a patterned metal plate, for example one of the patterns shown in FIGS. 5-7, and a rubber plate and pressed at a pressure of about 1500 psi wherein the plates are heated to a temperature of about 138° C. for a time sufficient to generate deformations in the surface(s) of the spunlaced fibrous structure that results in a textured spunlaced fibrous structure according the present invention.

Example 7—Textured Spunbond/Pulp/Spunbond Fibrous Structure

A spunbond fibrous structure may be made by any suitable spunbonding process, for example by spinning a spunbond web onto a forming fabric. Pulp may be deposited onto the spunbond web after spinning the spunbond web and/or during spinning of the spunond web. One or more additional webs, for example spunbond and/or meltblown webs, may be added to the spunbond/pulp structure by any suitable spunbond and/or meltblown process to sandwich the pulp between the first spunbond web and the additional web to form a spunbond/pulp/spunbond fibrous structure for example. The spunbond/pulp/spunbond fibrous structure may be thermally bonded by any suitable thermal bonding process and any suitable thermal bonding pattern.

The spunbond/pulp/spunbond fibrous structure is then subjected to a deformation generating operation that results in a plurality of deformations, for example protrusions and/or depressions, being generated on one or more surfaces of the spunbond/pulp/spunbond fibrous structure by placing the spunbond/pulp/spunbond fibrous structure between a patterned metal plate, for example one of the patterns shown in FIGS. 5-7, and a rubber plate and pressed at a pressure of about 1500 psi wherein the plates are heated to a temperature of about 138° C. for a time sufficient to generate deformations in the surface(s) of the spunbond/pulp/spunbond fibrous structure that results in a textured spunbond/pulp/spunbond fibrous structure according the present invention.

Example 8—Pre-Moistened Wipe

A pre-moistened wipe according to the present invention is prepared as follows. A textured fibrous structure of the present invention, for example a textured fibrous structure according to Examples 1 to 7, of about 44 g/m$^2$ is saturation loaded with a liquid composition according to the present invention to an average saturation loading of about 358% of the basis weight of the wipe. The wipes are then Z-folded and placed in a stack to a height of about 82 mm.

Example 9—Pre-Moistened Wipe

A pre-moistened wipe according to the present invention is prepared as follows. A textured fibrous structure of the present invention, for example a textured fibrous structure according to Examples 1 to 7, of about 61 g/m$^2$ is saturation loaded with a liquid composition according to the present invention to an average saturation loading of about 347% of the basis weight of the wipe. The wipes are then Z-folded and placed in a stack to a height of about 82 mm.

Example 10—Pre-Moistened Wipe

A pre-moistened wipe according to the present invention is prepared as follows. A textured fibrous structure of the present invention, for example a textured fibrous structure according to Examples 1 to 7, of about 65 g/m$^2$ is saturation loaded with a liquid composition according to the present invention to an average saturation loading of about 347% of the basis weight of the wipe. The wipes are then Z-folded and placed in a stack to a height of about 82 mm.

Test Methods

Unless otherwise indicated, all tests described herein including those described under the Definitions section and the following test methods are conducted on samples that have been conditioned in a conditioned room at a temperature of 23° C.±2.2° C. and a relative humidity of 50%±10% for 24 hours prior to the test. All tests are conducted in such conditioned room.

For the dry test methods described herein (Liquid Absorptive Capacity, Pore Volume Distribution, Basis Weight, and Dynamic Absorption Time), if the fibrous structure or wipe comprises a liquid composition such that the fibrous structure or wipe exhibits a moisture level of about 100% or greater by weight of the fibrous structure or wipe, then the following pre-conditioning procedure needs to be performed on the fibrous structure or wipe before testing. If the fibrous structure or wipe comprises a liquid composition such that the fibrous structure or wipe exhibits a moisture level of less than about 100% by weight but greater than about 10% by weight of the fibrous structure or wipe, dry the fibrous structure or wipe in an oven at 85° C. until the fibrous structure or wipe contains less than 3% moisture by weight of the fibrous structure or wipe prior to completing the dry test methods.

To pre-condition a fibrous structure or wipe comprising a moisture level of about 100% or greater by weight of the fibrous structure or wipe use the following procedure. Fully saturate the fibrous structure or wipe by immersing the fibrous structure or wipe sequentially in 2 L of fresh distilled water in each of 5 buckets, where the water is at a temperature of 23° C.±2.2° C. Gently, agitate the fibrous structure or wipe in the water by moving the fibrous structure or wipe from one side of each bucket to the other at least 5 times, but no more than 10 times for 20 seconds in each of the 5 buckets. Remove the fibrous structure or wipe and then place horizontally in an oven at 85° C. until the fibrous structure or wipe contains less than 3% moisture by weight of the fibrous structure or wipe. After the fibrous structure or wipe exhibits less than 3% moisture, remove from the oven and allow the fibrous structure or wipe to equilibrate to about 23° C.±2.2° C. and a relative humidity of 50%±10% for 24 hours prior to the testing. Care needs to be taken to ensure that the fibrous structure and/or wipe is not compressed.

For the wet test methods described herein (Soil Leak Through, CD Wet Initial Tensile Strength, Lotion Release, Saturation Loading, and Saturation Gradient Index), if the fibrous structure or wipe comprises a moisture level of 0% to less than about 100% by weight of the fibrous structure or wipe, then the following pre-conditioning procedure needs to be performed on the fibrous structure or wipe prior to testing. If the fibrous structure or wipe comprises a moisture level of about 100% or greater, then the following pre-conditioning procedure is not performed on the fibrous structure or wipe.

To pre-condition a fibrous structure or wipe comprising a moisture level of 0% to less than about 100% by weight of the fibrous structure or wipe, add an amount of distilled water to the fibrous structure or wipe to achieve a 3.5 g/g saturation loading on the fibrous structure or wipe.

After the fibrous structure or wipe is saturation loaded to a 3.5 g/g saturation loading, allow the fibrous structure or wipe to equilibrate to about 23° C.±2.2° C. and a relative humidity of 50%±10% for 24 hours prior to the testing. Care needs to be taken to ensure that the fibrous structure and/or wipe is not compressed.

Surface Height Test/Element Characterization Test Method

Substrate surface Sa, Sq and Sk parameters, pattern element dimension and inter-element distance measurements are obtained using a GFM MikroCAD Premium instrument commercially available from GFMesstechnik GmbH, Teltow/Berlin, Germany, or equivalent. The system includes the following main components: a) a Digital Light Processing (DLP) projector with direct digital controlled micro-mirrors; b) a CCD camera with at least a 1600×1200 pixel resolution; c) projection optics adapted to a measuring area of at least 60 mm×45 mm; d) recording optics adapted to a measuring area of 60 mm×45 mm; e) a table tripod based on a small hard stone plate; f) a blue LED light source; g) a measuring, control, and evaluation computer running ODSCAD software (version 6.2, or equivalent); and h) calibration plates for lateral (x-y) and vertical (z) calibration available from the vendor.

The GFM MikroCAD Premium system measures the surface height of a sample using the digital micro-mirror pattern fringe projection technique. The result of the analysis is a map of surface height (z-directional or z-axis) versus displacement in the x-y plane. The system has a field of view of 60×45 mm with an x-y pixel resolution of approximately 40 microns. The height resolution is set at 0.5 micron/count, with a height range of +/−15 mm. All testing is performed in a conditioned room maintained at about 23±2° C. and about 50±2% relative humidity.

To obtain the samples to be measured, open a new package of wet wipes and remove the entire stack from the package. Discard the first 5 wipes from the top and bottom of the stack, and then remove 2 wipe samples from the top, middle and bottom of the stack, for a total of 6 wipe samples to be analyzed per package. A total of three packages should be measured, for a total of 18 samples. Lay all of the samples out flat and allow them to completely dry prior to testing.

Calibrate the instrument according to manufacturer's specifications using the calibration plates for lateral (x-y axis) and vertical (z axis) available from the vendor.

Place specimen on the table beneath the camera. Center the specimen within the camera field of view, so that only the specimen surface is visible in the image. Place a steel frame (100 mm square, 1.5 mm thick with an opening 70 mm square) on the sample to ensure the specimen lays flat with minimal wrinkles, and still allows for an unobstructed access to the surface area being scanned.

Collect a height image (z-direction) of the specimen by following the instrument manufacturer's recommended measurement procedures. Select the Technical Surface/Standard measurement program with the following operating parameters: Utilization of fast picture recording with a 3 frame delay. Dual phaseshifts are used with 1) 16 pixel stripe width with a picture count of 12 and 2) 32 pixel stripe width with a picture count of 8. A full Graycode starting with pixel 2 and ending with pixel 512. No filtering or pre-filtering options should be utilized. After selection of the measurement program, continue to follow the instrument manufacturer's recommended procedures for focusing the measurement system and performing the brightness adjustment. Perform the 3D measurement then save the height image and camera image files.

a. Sa, Sq and Sk Measurements:

Sa and Sq are described in ISO 25178-2:2012. Sa is the average of the absolute values of the profile heights of the roughness surface, and Sq is the root mean square of the profile heights of the roughness surface. The parameter Sk is derived from the Areal Material Ratio (Abbott-Firestone) curve described in ISO 13565-2:1996 standard extrapolated to surfaces, it is the cumulative curve of the surface height distribution histogram versus the range of surface heights. The Core Roughness Depth, Sk, is the height difference between the material ratios Mr1 and Mr2 as read off of the Areal Material Ratio curve. Mr1, set to 10%, is the material ratio which separates the protruding peaks from the core roughness region. Mr2, set to 90%, is the material ratio which separates the deep valleys from the core roughness region.

Load the height image into the analysis portion of the software via the clipboard. The following filtering procedure is then performed on each image: 1) removal of invalid points; 2) 3×3 pixel median filter to remove noise. Open the window to calculate surface roughness parameters. Set the wavelength limit for the Gaussian high pass filter to 25 mm to filter out large scale waviness in the sample. Calculate the roughness parameters using only a planar automatic alignment and Gaussian high pass areal filter with a repeat number of 1. Record the surface roughness values for Sa, Sq and Sk to the nearest 0.1 µm. Save a copy of the filtered roughness image. Repeat this procedure for the remaining replicate samples. Average together the 18 replicate Sa, Sq and Sk measures and report these values to the nearest 0.1 µm.

b. Pattern Element Dimension Measurements

The pattern element dimension measurements are obtained by analysis of a binary image where all of the regions in the filtered roughness image above the threshold height value are black and those below are white. To generate the binary image, first open the filtered roughness image, which was produced by taking the original height image through the following filtering/flattening procedure: 1) removal of invalid points; 2) 3×3 pixel median filter to remove noise; 3) planar alignment; and 4) Gaussian high pass areal filter with a wavelength limit of 25 mm. Next, open the histogram of the image and identify the $50^{th}$ percentile height from the cumulative histogram. This is the height threshold for the pattern element dimension analysis.

One skilled in the art will recognize that there are various methods to obtain a binary image where the regions in the filtered roughness image above the threshold height value are black and those below are white. One such method is to save a grayscale image in the ODSCAD software where the heights below the threshold value are black and those above are shades of gray. This is accomplished by displaying the height image using the grayscale color map and then manually setting the minimum z-scale value to the threshold height value ($50^{th}$ percentile height). This step produces an image where the height values below the $50^{th}$ percentile are black, enabling them to be threshold out in a later image processing step. Export and save this image as a JPEG for further image analysis.

To complete the generation of the binary image, and analyze the pattern element dimensions, open the saved JPEG file of the grayscale height image in ImageJ software (v. 1.47 or equivalent, National Institute of Health, USA). For this analysis the resolution of the image should be 16.5 pixels per mm, or 0.0606 mm per pixel. If the image is at a higher resolution, resize the number of pixels in the image to obtain this resolution, if the image is at a lower resolution make adjustments in the step where the JPEG image was generated to obtain a higher resolution image, and then resize the image to the correct resolution. Once the appropriate resolution has been obtained, set the scale of the image. If necessary, crop the image so that it only contains the 60 mm×45 mm field of view from the height image.

Convert the scaled and cropped image to 8-bit grayscale, display the image histogram and determine the graylevel value nearest to the $50^{th}$ percentile from a cumulative histogram. Threshold the image at the $50^{th}$ percentile graylevel (GL) value to generate a binary image. This step produces a binary image threshold at the $50^{th}$ percentile of the height distribution, which separates the black pixels, representing the areas below the $50^{th}$ percentile height, from the gray pixels above that height. Initially, the binary image may display the regions above the height threshold as white (GL value of 0). If so, invert the image so that the pattern elements above the threshold height will appear as black (GL value of 255) and those below as white (GL value of 0). Next, two morphological operations are performed on the binary image. First, opening (an erosion operation followed by a dilation operation, iterations=1, count=1), which removes isolated black pixels. Second, closing (a dilation operation followed by an erosion operation, iterations=1, count=1), which fills in small holes. Lastly, use the fill holes operation to fill in any remaining voids within the pattern elements.

Select the analyze particles function. Set for the analysis to exclude the edge elements, so that only whole elements are measured. Set the software to calculate to two decimal places (the nearest 0.01 mm) the following pattern element parameters: Area, Perimeter, Feret (length of the element), Feret Angle (angle of element length) and Minimum Feret (width of the element perpendicular to the element length). Display and save all of these measurements for each of the individual elements. In addition to these measurements, an Aspect Ratio for each element can be calculated by dividing the element length by its width, as well as, a Perimeter to Area ratio. Again select the analyze particles function, but his time set the analysis to include the edge holes and record the total count of elements identified in the image. Repeat this procedure for all replicate images.

c. Inter-Element Distance Measurements

The average, standard deviation and median distance between the pattern elements can be measured by further analyzing the binary image that was analyzed for the pattern element measurements. First, obtain a duplicate copy of the binary image, and perform a Voronoi operation. This generates an image of cells bounded by lines of points having equal distance to the borders of the two nearest pattern elements, where the pixel values are outputs from a Euclidian distance map (EDM) of the binary image. An EDM is generated when each inter-element pixel in the binary image is replaced with a value equal to that pixel's distance from the nearest pattern element. Next, remove the background zeros to enable statistical analysis of the distance values. This is accomplished by using the image calculator to divide the Voronoi cell image by itself to generate a 32-bit floating point image where all of the cell lines have a value of one, and the remaining parts of the image are identified as Not a Number (NaN). Lastly, using the image calculator, multiply this image by the original Voronoi cell image to generate a 32-bit floating point image where the distance values along the cell lines remain, and all of the zero values have been replaced with NaN. Next, convert the pixel distance values into actual inter-element distances by multiplying the values in the image by the pixel resolution of the image (0.0606 mm per pixel), and then multiply the image again by 2 since the values represent the midpoint distance between elements. Measure and record the mean, standard deviation and median inter-element distance for the image to the nearest 0.01 mm. Repeat this procedure for all replicate images.

Pressure Mapping Test Method

Figure 16:
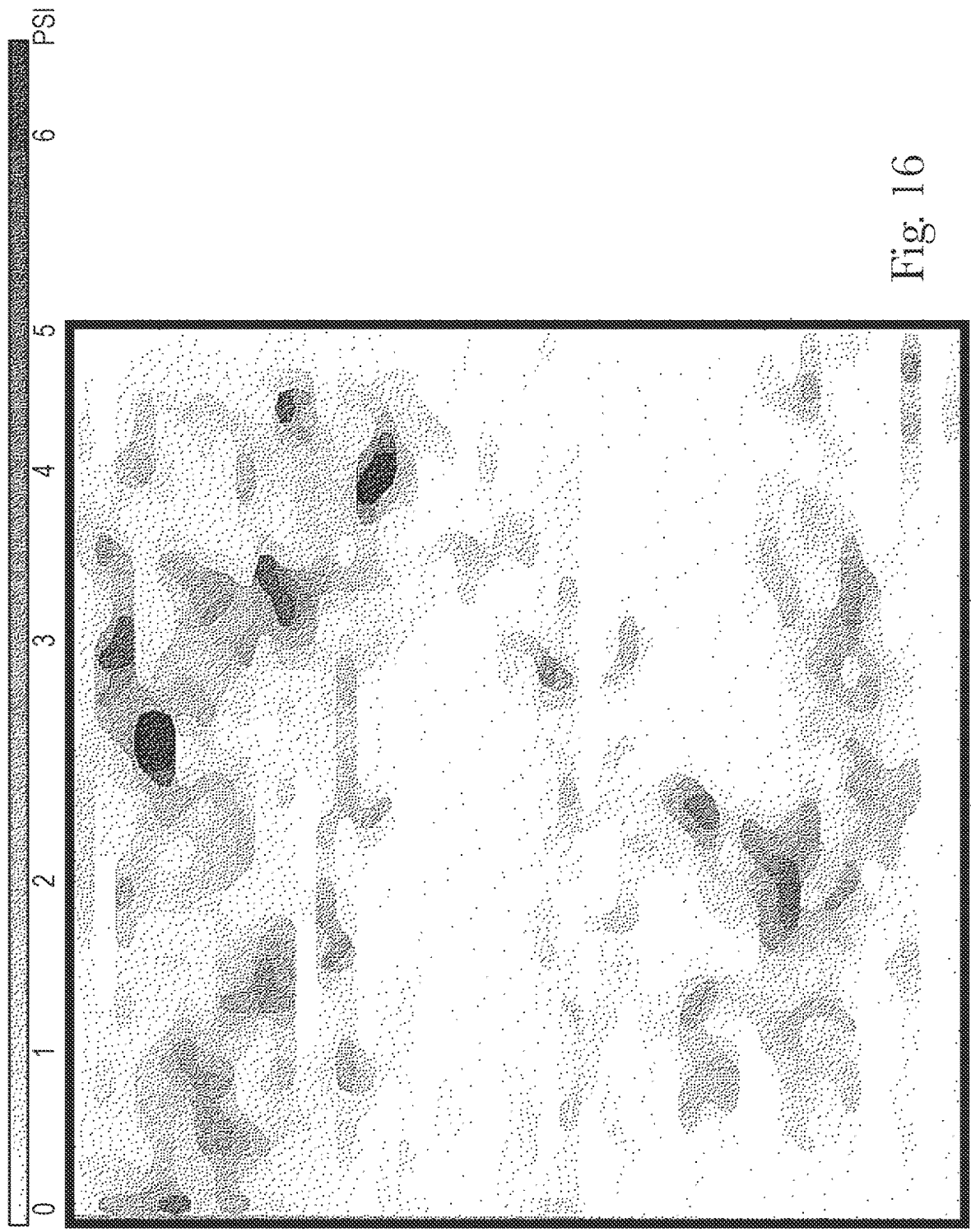
FIG. 16 is a pressure mapping image for another prior art textured fibrous structure.
Figure 18:
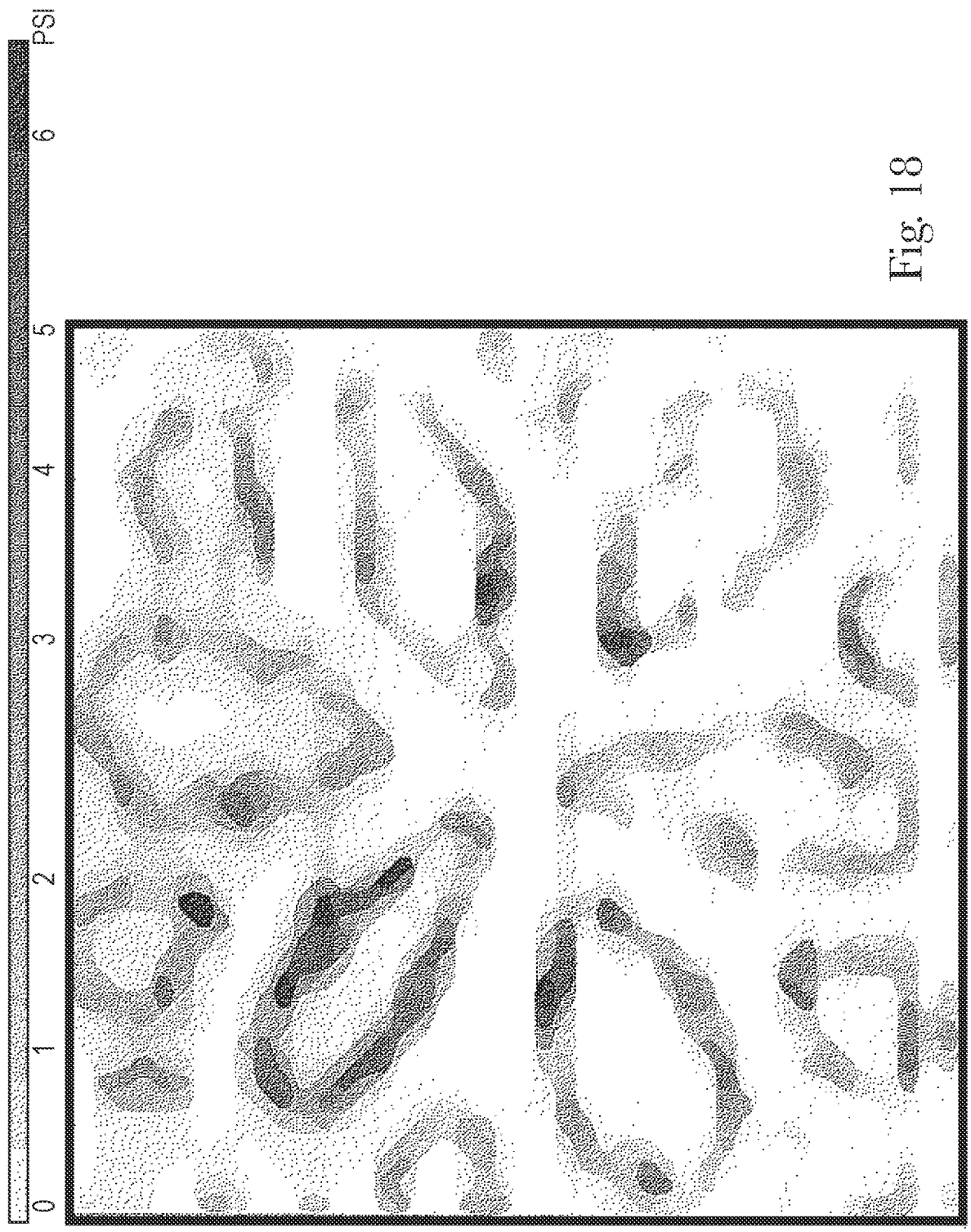
FIG. 18 is a pressure mapping image of a textured fibrous structure according to the present invention.

This method is suitable to determine the variation in pressure that is obtained by pressing a texture, such as described in FIGS. 16 (Huggies® NC) and 17 (Pampers® Sensitive) (both commercially available non-textured fibrous structures) and FIG. 18 (a textured fibrous structure according to the present invention) into another surface. A pressure mapping device from Tekscan is used (Tekscan Pressure Mapping System) together with the I-Scan software and a pressure sensor 5027 is used. The instrument is calibrated by placing the pressure senor between two hard and essentially non-deflecting plates, with the upper plate size exactly matching the size of the effective area of the sensor, with the lower plate exceeding the size of the effective of the sensor. The assembly, consisting of the 2 plates with the sensor between the 2 plates, is then placed on a flat surface. Additional weights are then placed on the upper plate to obtain a desired range of known pressures. The calibration routine available in the I-scan software is then used to calibrate the instrument. As an example, calibration weights of 0.1, 0.5, and 1 pound, including the weight of the upper plate, may be used to create a suitable range of pressures. The exact range of pressures used for the calibration and subsequent texture characterization, should however be chosen based on the relevant pressure range for the intended application or prediction.

Figure 17:
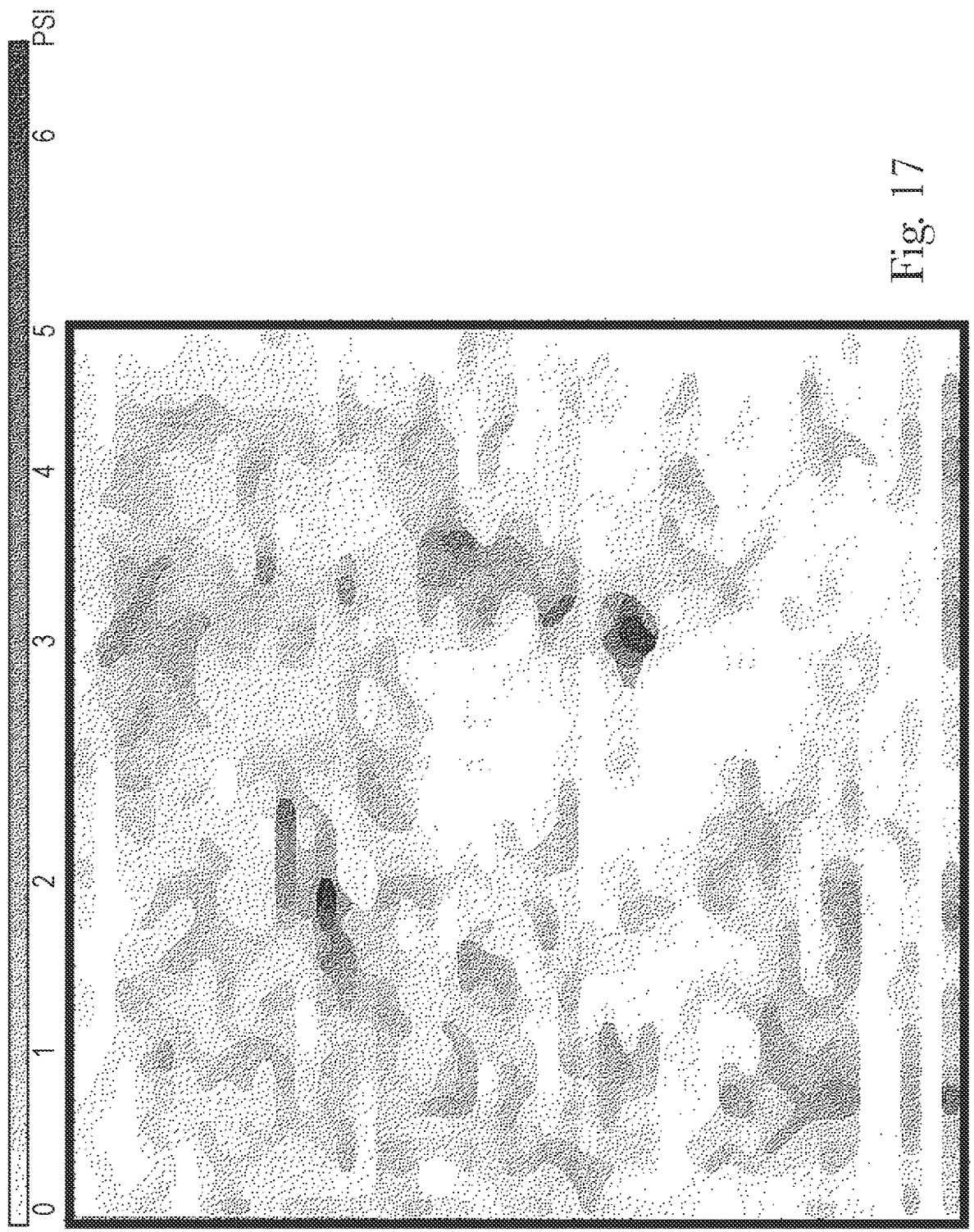
FIG. 17 is a pressure mapping image of another prior art textured fibrous structure.

To measure the pressure distribution generated from a particular textured sample, a piece of the sample is first cut, using a pair of scissors, to slightly exceed the size of the effective area of the sensor. The sensor is then placed on top of a non-deflecting hard surface, preferably the same plate as used for the calibration described above. The sample is then placed on top of the sensor. The smaller plate is them placed on top of the sample, and carefully positioned to be aligned with the effective area of the sensor. Additional weights, within the range used for calibration described above, can then be added on top of the upper plate to generate the desired total pressure. Positioning of additional weights needs to be done in such a way as not to create an uneven pressure distribution on the sample, and need to be carefully centered on top of the upper plate. The I-scan software is then used to create a visualization of the pressure distribution, as shown in FIGS. 16-18.

Liquid Absorptive Capacity Test Method

The following method, which is modeled after EDANA 10.4-02, is suitable to measure the Liquid Absorptive Capacity of any fibrous structure or wipe.

Prepare 5 samples of a pre-conditioned/conditioned fibrous structure or wipe for testing so that an average Liquid Absorptive Capacity of the 5 samples can be obtained.

Materials/Equipment
1. Flat stainless steel wire gauze sample holder with handle (commercially available from Humboldt Manufacturing Company) and flat stainless steel wire gauze (commercially available from McMaster-Carr) having a mesh size of 20 and having an overall size of at least 120 mm×120 mm
2. Dish of size suitable for submerging the sample holder, with sample attached, in a test liquid, described below, to a depth of approximately 20 mm
3. Binder Clips (commercially available from Staples) to hold the sample in place on the sample holder
4. Ring stand
5. Balance, which reads to four decimal places
6. Stopwatch 7. Test liquid: deionized water (resistivity>18 megaohms·cm)

Procedure

Prepare 5 samples of a fibrous structure or wipe for 5 separate Liquid Absorptive Capacity measurements. Individual test pieces are cut from the 5 samples to a size of approximately 100 mm×100 mm, and if an individual test piece weighs less than 1 gram, stack test pieces together to make sets that weigh at least 1 gram total. Fill the dish with a sufficient quantity of the test liquid described above, and allow it to equilibrate with room test conditions. Record the mass of the test piece(s) for the first measurement before fastening the test piece(s) to the wire gauze sample holder described above with the clips. While trying to avoid the creation of air bubbles, submerge the sample holder in the test liquid to a depth of approximately 20 mm and allow it to sit undisturbed for 60 seconds. After 60 seconds, remove the sample and sample holder from the test liquid. Remove all the binder clips but one, and attach the sample holder to the ring stand with the binder clip so that the sample may vertically hang freely and drain for a total of 120 seconds. After the conclusion of the draining period, gently remove the sample from the sample holder and record the sample's mass. Repeat for the remaining four test pieces or test piece sets.

Calculation of Liquid Absorptive Capacity

Liquid Absorptive Capacity is reported in units of grams of liquid composition per gram of the fibrous structure or wipe being tested. Liquid Absorptive Capacity is calculated as follows for each test that is conducted:

$$\text{LiquidAbsorptive Capacity} = \frac{M_X - M_i}{M_i}$$

In this equation, $M_i$ is the mass in grams of the test piece(s) prior to starting the test, and $M_x$ is the mass in grams of the same after conclusion of the test procedure. Liquid Absorptive Capacity is typically reported as the numerical average of at least five tests per sample.

Pore Volume Distribution Test Method

Pore Volume Distribution measurements are made on a TRI/Autoporosimeter (TRI/Princeton Inc. of Princeton, N.J.). The TRI/Autoporosimeter is an automated computer-controlled instrument for measuring pore volume distributions in porous materials (e.g., the volumes of different size pores within the range from 2.5 to 1000 □µm effective pore radii). Complimentary Automated Instrument Software, Release 2000.1, and Data Treatment Software, Release 2000.1 is used to capture, analyze and output the data. More information on the TRI/Autoporosimeter, its operation and data treatments can be found in The Journal of Colloid and Interface Science 162 (1994), pgs 163-170, incorporated here by reference.

As used in this application, determining Pore Volume Distribution involves recording the increment of liquid that enters a porous material as the surrounding air pressure changes. A sample in the test chamber is exposed to precisely controlled changes in air pressure. The size (radius) of the largest pore able to hold liquid is a function of the air pressure. As the air pressure increases (decreases), different size pore groups drain (absorb) liquid. The pore volume of each group is equal to this amount of liquid, as measured by the instrument at the corresponding pressure. The effective radius of a pore is related to the pressure differential by the following relationship.

Pressure differential=[(2)γ cos Θ]/effective radius where γ=liquid surface tension, and Θ=contact angle.

Typically pores are thought of in terms such as voids, holes or conduits in a porous material. It is important to note that this method uses the above equation to calculate effective pore radii based on the constants and equipment controlled pressures. The above equation assumes uniform cylindrical pores. Usually, the pores in natural and manufactured porous materials are not perfectly cylindrical, nor all uniform. Therefore, the effective radii reported here may not equate exactly to measurements of void dimensions obtained by other methods such as microscopy. However, these measurements do provide an accepted means to characterize relative differences in void structure between materials.

The equipment operates by changing the test chamber air pressure in user-specified increments, either by decreasing pressure (increasing pore size) to absorb liquid, or increasing pressure (decreasing pore size) to drain liquid. The liquid volume absorbed at each pressure increment is the cumulative volume for the group of all pores between the preceding pressure setting and the current setting.

In this application of the TRI/Autoporosimeter, the liquid is a 0.2 weight % solution of octylphenoxy polyethoxy ethanol (Triton X-100 from Union Carbide Chemical and Plastics Co. of Danbury, Conn.) in 99.8 weight % distilled water (specific gravity of solution is about 1.0). The instrument calculation constants are as follows: ρ (density)=1 g/cm³; γ (surface tension)=31 dynes/cm; cos Θ=1. A 0.22 µm Millipore Glass Filter (Millipore Corporation of Bedford, Mass.; Catalog #GSWP09025) is employed on the test chamber's porous plate. A plexiglass plate weighing about 24 g (supplied with the instrument) is placed on the sample to ensure the sample rests flat on the Millipore Filter. No additional weight is placed on the sample.

The remaining user specified inputs are described below. The sequence of pore sizes (pressures) for this application is as follows (effective pore radius in µm): 2.5, 5, 10, 15, 20, 30, 40, 50, 60, 70, 80, 90, 100, 120, 140, 160, 180, 200, 225, 250, 275, 300, 350, 400, 500, 600, 800, 1000. This sequence starts with the fibrous structure or wipe sample dry and saturates it as the pore settings increase (typically referred to with respect to the procedure and instrument as the $1^{st}$ absorption).

In addition to the fibrous structure or wipe sample being tested, a blank condition (no sample between a plexiglass plate and Millipore Filter) is run to account for any surface and/or edge effects within the test chamber. Any pore volume measured for this blank condition is subtracted from the applicable pore grouping of the fibrous structure or wipe sample being tested. If upon subtracting the blank condition the result is 0 or negative then report a 0 for that pore range. This data treatment can be accomplished manually or with the available TRI/Autoporosimeter Data Treatment Software, Release 2000.1.

Percent (%) Total Pore Volume is a percentage calculated by taking the volume of fluid in the specific pore radii range divided by the Total Pore Volume. The TRI/Autoporosimeter outputs the volume of fluid within a range of pore radii. The first data obtained is for the "5.0 micron" pore radii which includes fluid absorbed between the pore sizes of 2.5 to 5.0 micron radius. The next data obtained is for "10 micron" pore radii, which includes fluid absorbed between the 5.0 to 10 micron radii, and so on. Following this logic, to obtain the volume held within the range of 91-140 micron radii, one would sum the volumes obtained in the range titled "100 micron", "110 micron", "120 micron", "130 micron", and finally the "140 micron" pore radii ranges. For example, % Total Pore Volume 91-140 micron pore radii=(volume of fluid between 91-140 micron pore radii)/Total Pore Volume. Total Pore Volume is the sum of all volumes of fluid between 2.5 micron and 1000 micron pore radii.

Basis Weight Test Method

Basis weight is measured prior to the application of any end-use lotion, cleaning solution, or other liquid composition, etc. to the fibrous structure or wipe, and follows a modified EDANA 40.3-90 (February 1996) method as described herein below.

1. Cut at least three test pieces of the fibrous structure or wipe to specific known dimensions, preferably using a pre-cut metal die and die press. Each test piece typically has an area of at least 0.01 m².
2. Use a balance to determine the mass of each test piece in grams; calculate basis weight (mass per unit area), in grams per square meter (gsm), using equation (1).

$$\text{Basis Weight} = \frac{\text{Mass of Test Piece (g)}}{\text{Area of Test Piece (m}^2)} \quad (1)$$

3. For a fibrous structure or wipe sample, report the numerical average basis weight for all test pieces.
4. If only a limited amount of the fibrous structure or wipe is available, basis weight may be measured and reported as the basis weight of one test piece, the largest rectangle possible.
5.

Dynamic Absorption Time (DAT) Test Method

DAT provides a measure of the ability of the fibrous structure or wipe to absorb a test liquid and the time it takes for the test liquid to be absorbed by the fibrous structure or wipe, which is in turn used as a measure of how well a fibrous structure or wipe will absorb liquid into the fibrous structure or wipe.

The DAT test method measures the dimensions of a drop of a liquid composition, in this case a drop of a lotion, from the moment it is in contact with a fibrous structure or wipe to when the drop is absorbed by the fibrous structure or wipe. The method also measures the rate of change of the dimensions of the drop with respect to time. Fibrous structures or wipes characterized by low DAT and low initial contact angle values may be more absorbent than those characterized by higher DAT and/or higher initial contact angle values.

Dynamic Absorbency Test (DAT) measurements of a fibrous structure or wipe are made utilizing a Thwing Albert DAT Fibro 1100 (Thwing Albert, PA). The DAT Fibro 1100 is an automated computer-controlled instrument for measuring contact angle of a drop of a liquid composition on porous materials and the time it takes for the drop of a liquid composition to absorb into the fibrous structure or wipe. Contact angle refers to the angle formed by the fibrous structure or wipe and the tangent to the surface of the liquid composition drop in contact with the fibrous structure or wipe. More information on absorbency of sheet materials using an automated contact angle tester can be found in ASTM D 5725-95.

The DAT contact angle measurements provide a means that is used in the art to characterize relative differences in absorbent properties of materials.

The equipment operates by controlling the volume and the ejection pulse of a small drop of a liquid composition discharged directly onto the surface of a fibrous structure or wipe. The height, base and angle produced as the liquid composition drop settles and becomes absorbed into the fibrous structure or wipe are determined based on an internal calibrated gray scale. In this application, a DAT Fibro 1100 series model (high speed camera resolution for porous absorbent paper substrates) is calibrated according to the manufacturer's instructions and using a 0.292 calibration sled. The instrument is set to discharge a 4 microliter (µL) drop of a liquid composition, a stroke pulse of 8, canula tip of 340, drop bottom of 208, and paper position of 134.

The fibrous structure or wipe samples to be tested are cut to approximately 0.5 inches in length and not exceeding the width of the sample sled associated with the testing equipment. The fibrous structure or wipe samples are cut along the MD direction of the fibrous structure or wipe to minimize neckdown and structural changes during handling. The fibrous structure or wipe samples as well as the liquid composition(s) to be dropped onto the fibrous structures or wipes are allowed to equilibrate to 23°±2.2° C. and 50% relative humidity for at least 4 hours. The liquid composition(s) are prepared by filling a clean dry syringe (0.9 mm diameter, part #1100406, Thwing Albert) at least half way. The syringe should be rinsed with the liquid composition of interest prior to the test and this can be achieved by filling/emptying the syringe 3 consecutive times with the liquid composition. In the present measurements, the liquid composition used is an aqueous composition that contains distilled water and a nonionic surfactant; namely, Triton® X 100, which is commercially available from Dow Chemical Company, at levels to result in the aqueous composition exhibiting a surface tension of 30 dynes/cm. The fibrous structure or wipe and the liquid composition are loaded into the instrument according to the manufacturer's instructions. The controlling software is designed to eject the liquid composition onto the fibrous structure or wipe and measure the following parameters: time for the liquid composition to absorb into fibrous structure or wipe, contact angle, base, height, and volume.

A total of 10 measurements of the time the liquid composition drop takes to be absorbed by the fibrous structure or wipe for each side of the fibrous structure or wipe are made. The reported DAT value (in seconds) is the average of the 20 measurements (10 from each side) of a fibrous structure or wipe.

Soil Leak Through Test Method

The following method is used to measure the soil leak through value for a fibrous structure or wipe.

First, prepare a test composition to be used in the soil leak through test. The test composition is prepared by weighing out 8.6 g of Great Value Instant chocolate pudding mix (available from WalMart—do not use LowCal or Sugar Free pudding mix). Add 10 mL of distilled water to the 8.6 g of mix. Stir the mix until smooth to form the pudding. Cover the pudding and let stand at 23° C.±2.2° C. for 2 hours before use to allow thorough hydration of the pudding mix.

The Great Value Instant chocolate pudding mix can be purchased at http://www.walmart.com/ip/Great-Value-Chocolate-Instant-Pudding-3.9-oz/10534173. The ingredients listed on the Great Value Instant chocolate pudding mix are the following: Sugar, Modified Food Starch, Dextrose, Cocoa Powder Processed With Alkali, Disodium Phosphate, Contains 2% Or Less Of Nonfat Dry Milk, Tetrasodium Pyrophosphate, Salt, Natural And Artificial Flavoring, Mono- And Diglycerides (Prevent Foaming), Palm Oil, Red 40, Yellow 5, Blue 1. Titanium Dioxide (For Color). Allergy Warning: Contains Milk. May Contain Traces Of Eggs, Almonds, Coconut, Pecans, Pistachios, Peanuts, Wheat And Soy.

Transfer the test composition to a syringe using a sterile tongue depressor for ease of handling.

Tare weight of a piece of wax paper. The basis weight of the wax paper is about 35 gsm to about 40 gsm. Wax paper is supplied from the Reynolds Company under the Cut-Rite brand name. Weigh out 0.6±0.05 g of the test composition on the wax paper. Prepare 5 samples of a fibrous structure or wipe to be tested. The 5 samples of fibrous structure or wipe are cut, if necessary to dimensions of 150 mm×150 mm. One of the 5 samples will be the control sample (no test composition will be applied to it). On a flat surface, place the wax paper with the test composition onto one of the remaining 4 test samples of fibrous structure or wipe that has been folded in half to create a two-ply structure such that the test composition is positioned between an exterior surface of the fibrous structure or wipe and the wax paper. Gently place a 500 g balance weight with a 1⅝ inch diameter (yielding about 0.5 psi) on the wax paper, e.g.) for 10 seconds making sure not to press on the weight when placing the weight on the wax paper. 500 gram balance weights are available from the McMaster-Carr Company. After the 10 seconds, remove the weight and gently unfold the fibrous structure or wipe. Examine the soil color visible from the interior surface of the de facto "second ply" (the surface of the portion of the fibrous structure or wipe that is facing inward and is not the backside of the portion of the fibrous structure or wipe to which the test composition was applied). A Hunter Color Lab Scan is used to examine this interior surface. The color may diffuse over time; so examine the wipes at a consistent time interval (within 10 minutes after placing the weight on the wax paper) for better sample to sample comparison. Repeat the test composition application procedure for the remaining test samples of fibrous structure or wipe.

The color present on the interior surface of each test sample of fibrous structure or wipe to be analyzed is then analyzed using a Hunter Color Lab instrument.

Hunter Color Lab Scan Procedure (Calibration)
1. Set scale to XYZ.
2. Set observer to 10.
3. Set both illuminations to D65.
4. Set procedure to none and click ok.
5. Check to see if read procedures is set to none.
6. Place green plate on port and click read sample. Enter sample ID green.
7. Place white plate on port and click read sample. Enter sample ID white.
8. Open calibration excel file, click on file save as and enter today's date.
9. Go back to test page of hunter color and highlight XY&Z numbers, click on edit, copy.
10. Open up today's calibration sheet and paste numbers in the value read cell. Check value read to actual value. Values must be within specs to pass.
11. Printout calibration report.

(Test)
1. Click on active view.
2. Set Scale to Cielab.
3. Set both illuminate to C.
4. Set observer to 2.
5. Set procedure to none.
6. Click ok.
7. Click clear all.
8. Scan the control sample to measure and record the L value of the control sample.
9. After removing the weight from a test sample of fibrous structure or wipe as described above, unfold the test sample and place the test sample of fibrous structure or wipe on instrument port such that the color of the interior surface of the de facto "second ply" as described above can be analyzed. Place a fresh piece of wax paper on top of the test sample to avoid contaminating the instrument.
10. Click read sample to measure and record the L value of the test sample. Enter name of sample. Click ok. Repeat for the remaining test samples.
11. After the L values of the 4 test samples have been measured and recorded, average the L values for the 4 test samples.
12. Calculate the Soil Leak Through Lr Value for the fibrous structure or wipe tested by determining the difference between the L value of the control sample and the average L value of the 4 test samples.

The reported Soil Leak Through Lr Value is the difference in the L color value from the Hunter Color Lab between the control sample and the test sample of the fibrous structure or wipe. A Soil Leak Through Lr Value of less than 20 and/or less than 15 and/or less than 10 and/or less than 5 and/or less than 2 is desirable. The lower the value, the more the fibrous structure or wipe prevents soil leak through.

A suitable equivalent to the Great Value Instant chocolate pudding mix test composition can be made by the following procedure for use in the test method described above.

First, a test composition for testing purposes is prepared. In order to make the test composition, a dry powder mix is first made. The dry powder mix comprises dehydrated tomato dices (Harmony House or NorthBay); dehydrated spinach flakes (Harmony House or NorthBay); dehydrated cabbage (Harmony House or NorthBay); whole psyllium husk (available from Now Healthy Foods that has to be sieved with 600 µm cutoff to collect greater than 600 µm particles and then ground to collect 250-300 µm particles) (alternatively available from Barry Farm as a powder that has to be sieved to collect 250-300 µm particles); palmitic acid (95% Alfa Aeser B20322); and calcium stearate (Alfa Aeser 39423). Next add food grade yeast powders commercially available as Provesta® 000 and Ohly® HTC (both commercially available from Ohly Americas, Hutchinson, Minn.).

If grinding of the vegetables needs to be performed, an IKA All basic grinder (commercially available from VWR or Rose Scientific LTD) is used. To grind the vegetables, add the vegetable flakes to the grinding bowl. Fill to the mark (within the metal cup, do not over fill). Power on for 5 seconds. Stop. Tap powder 5 times. Repeat power on (for 5 seconds), stop and tap powder (5 times) procedure 4 more times. Sieve the ground powder by stacking a 600 µm opening sieve on top of a 300 µm opening sieve such that powders of 300 µm or less are collected. Regrind any remaining powders that are larger than 300 µm one time. Collect powders of 300 µm or less.

The test composition is prepared by mixing the above identified ingredients in the following levels in Table 3 below.

TABLE 3

| Soil Powder Premix | Grams | % |
|---|---|---|
| Tomato Powder | 20.059 | 18.353 |
| Psyllium Husk | 0.599 | 0.548 |

TABLE 3-continued

| Soil Powder Premix | Grams | % |
|---|---|---|
| Cabbage | 2.145 | 1.963 |
| Spinach Powder | 8.129 | 7.438 |
| Provesta 000 | 40.906 | 37.428 |
| Ohly HCT | 16.628 | 15.214 |
| Palmitic acid/Calcium Stearate (2:1) | 20.827 | 19.056 |

The palmitic acid/calcium stearate blend is prepared by grinding together and collecting powders of 300 µm or less from a blend of 20.0005 g palmitic acid and 10.006 g calcium stearate.

To make up the test composition, 21 g of distilled water at 23° C.±2.2° C. is added to every 9 g of the soil powder premix described above in Table 3 used in a suitable container. A tongue depressor is used to stir the composition until the composition, which may be a paste, is homogeneous, about 2 minutes of stirring. Cover the container loosely with a piece of aluminum foil and let stand for 2 hours at 23°±2.2° C. Next add 4 drops of FD&C Red Dye #40 and stir until completely mixed, about 2 minutes of stirring. The test composition is ready for use in the soil leak through test.

CD Wet Initial Tensile Strength Test Method

The CD Wet Initial Tensile Strength of a fibrous structure or wipe is determined using a modified EDANA 20.2.89 method, which generally sets forth the following test method.

Cut 5—50±0.5 mm wide (MD) and more than 150 mm long (CD) test strips (so that a distance of 100 mm can be obtained between the jaws of the dynamometer) of the fibrous structure or wipe to be tested with a laboratory paper cutter or a template and scalpel (not scissors, as the test pieces must be cut out cleanly according to ERT 130).

Using a tensile testing machine (dynamometer) with a constant rate of extension (100 mm/min) and jaws 50 mm wide (capable of holding the cut sample securely across their full widths without damage) and fitted with a system for recording force—elongation curves.

Place a strip to be tested in the jaws of the tensile testing machine, the jaws being 100 mm±1 mm apart.

Apply a constant rate of extension (100 mm/min) and record the force-elongation curve.

Discard the results from any test strip where the break occurs in the clamp or where any break reaches the jaws.

Establish the scale of force-elongation curve. Use the force-elongation curve to determine the CD Wet Initial Tensile Strength in newtons (N). If several peak values for the applied force occur during the test, take the highest value as the CD Wet Initial Tensile Strength of the strip and note this in the test report. Repeat the procedure on additional strips from the fibrous structure wipe to get an average CD Wet Initial Tensile Strength from 5 samples, which is the reported CD Wet Initial Tensile Strength in N to the nearest 0.1 N.

Lotion Release Test Method

The lotion release of a fibrous structure or wipe is determined by wiping the fibrous structure or wipe over a defined area, using a defined pressure and default speed of the instrument.

A wiping apparatus capable of simulating a wiping process is used. A suitable wiping apparatus is available from Manfred Führer GmbH, D-60489 Frankfurt, GERMANY. The wiping apparatus has a surface on which a skin analogue (a self-adhesive DC fix foil 40 cm×40 cm available from Konrad Hornschuch AG, 74679 Weissbach, GERMANY) is placed. The wiping apparatus further has a mechanical arm with a wiping hand (180 mm×78 mm) attached that applies a wiping pressure of 8.5 g/cm$^2$ to the skin analog.

To run the test, place the skin analogue on the surface of the wiping apparatus. With nitrile/powder free gloves on, weigh a fibrous structure or wipe to be tested to get its initial mass. Unfold the fibrous structure or wipe, if folded, and place it onto the already stuck skin analogue. Gently place the wiping hand on the top of the fibrous structure or wipe. Tightly attach the fibrous structure or wipe to the wiping hand such that only a 180 mm×78 mm portion of the fibrous structure or wipe will come into contact with the skin analogue when the wiping movements of the wiping hand are performed. Ensure that the wiping apparatus is on and perform 3 wiping movements. The first wiping movement is a 90° stroke of the wiping arm including the wiping hand and fibrous structure or wipe attached thereto. The second wiping movement is a 90° return stroke over the same portion of the skin analogue that the first wiping movement traveled. The third wiping movement is another 90° stroke of the wiping arm including the wiping hand and fibrous structure or wipe attached thereto, like the first wiping movement, and it travels over the same portion of the skin analogue as the first and second wiping movements. Carefully remove the fibrous structure or wipe from the wiping hand being careful not to wipe the fibrous structure or wipe on the skin analogue while removing it from the wiping hand. Weigh the fibrous structure or wipe again to obtain the final mass. The lotion release for the fibrous structure or wipe is the difference between the initial mass of the fibrous structure or wipe and the final mass of the fibrous structure or wipe. Clean the skin analogue with a dry tissue. Repeat the procedure again starting with weighing the next fibrous structure or wipe to get its initial mass. The reported lotion release value is the average lotion release value of 10 tested fibrous structures or wipes The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A pre-moistened textured fibrous structure comprising a textured fibrous structure that exhibits a Liquid Absorptive Capacity of at least 2.5 g/g as measured according to the Liquid Absorptive Capacity Test Method, wherein the textured fibrous structure comprises a first surface and a second surface opposite the first surface, wherein the first surface comprises a plurality of deformations comprising protrusions such that the first surface exhibits a root mean square average surface height value (Sq) of greater than 300 μm as measured according to the Surface Height Test Method.

2. The pre-moistened textured fibrous structure according to claim 1 wherein the pre-moistened textured fibrous structure comprises a plurality of fibrous elements.

3. The pre-moistened textured fibrous structure according to claim 2 wherein the plurality of fibrous elements comprise a plurality of filaments.

4. The pre-moistened textured fibrous structure according to claim 2 wherein the plurality of fibrous elements comprise a plurality of filaments and a plurality of fibers commingled together.

5. The pre-moistened textured fibrous structure according to claim 2 wherein at least one of the plurality of fibrous elements comprises a thermoplastic polymer.

6. The pre-moistened textured fibrous structure according to claim 5 wherein the thermoplastic polymer is selected from the group consisting of: polypropylene, polyethylene, and mixtures thereof.

7. The pre-moistened textured fibrous structure according to claim 2 wherein the plurality of fibrous elements comprise a plurality of fibers.

8. The pre-moistened textured fibrous structure according to claim 7 wherein the plurality of fibers comprise a plurality of pulp fibers.

9. The pre-moistened textured fibrous structure according to claim 8 wherein the plurality of pulp fibers comprise a plurality of wood pulp fibers.

10. A wet wipe comprising a pre-moistened textured fibrous structure according to claim 1.

11. A multi-ply pre-moistened textured fibrous structure comprising two or more of the pre-moistened textured fibrous structures according to claim 1 such that surfaces of the pre-moistened textured fibrous structure form exterior surfaces of the multi-ply fibrous structure.

12. A pre-moistened textured fibrous structure comprising a textured fibrous structure that exhibits a Liquid Absorptive Capacity of at least 2.5 g/g as measured according to the Liquid Absorptive Capacity Test Method, wherein the textured fibrous structure comprises a first surface and a second surface wherein each of the first and second surfaces comprises a plurality of deformations such that at least one of the first and second surfaces exhibits a height difference surface height value (Sk) of greater than 825 μm as measured according to the Surface Height Test Method.

13. The pre-moistened textured fibrous structure according to claim 12 wherein the textured fibrous structure comprises a plurality of fibrous elements.

14. The pre-moistened textured fibrous structure according to claim 13 wherein the plurality of fibrous elements comprise a plurality of filaments.

15. The pre-moistened textured fibrous structure according to claim 13 wherein the plurality of fibrous elements comprise a plurality of filaments and a plurality of fibers commingled together.

16. The pre-moistened textured fibrous structure according to claim 13 wherein at least one of the plurality of fibrous elements comprises a thermoplastic polymer.

17. The pre-moistened textured fibrous structure according to claim 13 wherein the plurality of fibrous elements comprise a plurality of fibers.

18. The pre-moistened textured fibrous structure according to claim 13 wherein the plurality of fibrous elements comprise a plurality of pulp fibers.

19. The pre-moistened textured fibrous structure according to claim 18 wherein the plurality of pulp fibers comprise a plurality of wood pulp fibers.

20. A wet wipe comprising a pre-moistened textured fibrous structure according to claim 12.

* * * * *